(12) United States Patent
Loxley et al.

(10) Patent No.: US 6,355,587 B1
(45) Date of Patent: Mar. 12, 2002

(54) QUARTZ GLASS PRODUCTS AND METHODS FOR MAKING SAME

(76) Inventors: Ted A. Loxley; John F. Blackmer; Klaus-Markus Peters, all of 3985 Ben Hur Ave., Willoughby, OH (US) 44094

( * ) Notice: Subject to any disclaimer, the term of this patent is extended or adjusted under 35 U.S.C. 154(b) by 0 days.

(21) Appl. No.: 08/914,288

(22) Filed: Aug. 18, 1997

Related U.S. Application Data

(63) Continuation-in-part of application No. 08/269,002, filed on Jun. 30, 1994, now abandoned, and a continuation of application No. 08/804,234, filed on Feb. 22, 1997, now Pat. No. 6,012,304.

(51) Int. Cl.$^7$ ............................. C03B 20/00; C03C 3/06
(52) U.S. Cl. ............................. 501/54; 501/56; 65/111; 65/17.3; 65/17.6; 65/22; 65/30.1; 65/32.1; 65/DIG. 8; 264/653; 264/654; 264/660; 264/666; 264/674; 264/681
(58) Field of Search .................. 501/54, 4, 56; 65/32.1, 30.1, 17.3, 17.6, 22, DIG. 8, 111; 264/666, 660, 653, 654, 674, 681

(56) References Cited

U.S. PATENT DOCUMENTS

| | | | | |
|---|---|---|---|---|
| 3,535,890 A | 10/1970 | Hansen | ........................ | 65/18 |
| 3,763,294 A | 10/1973 | Nicastro | ........................ | 264/57 |
| 3,775,077 A | 11/1973 | Nicastro | ........................ | 65/18 |
| 3,837,625 A | 9/1974 | Loxley | ........................ | 65/18 |
| 4,072,489 A | * 2/1978 | Loxley et al. | ............... | 65/32.1 |
| 5,972,488 A | * 10/1999 | Nagata et al. | ................ | 501/84 |

FOREIGN PATENT DOCUMENTS

| | | | |
|---|---|---|---|
| EP | 0477977 | | 4/1992 |
| JP | 4-65328 | * | 3/1992 |

* cited by examiner

Primary Examiner—Michael Marcheschi
(74) Attorney, Agent, or Firm—Vincent A. Greene

(57) ABSTRACT

The application discloses a number of unique sintered quartz glass products together with new silica compositions and processes for making and using such products. Nitrided clear and opaque nitrided quartz products are disclosed having incredible physical properties resulting from the incorporation of very small, but effective, amounts (e.g., 25 ppm or more) of chemically bound nitrogen. Opaque quartz glass heat shields with remarkable resistance to transmission of infrared radiation are disclosed which can have a high bubble population density, such as 80 to 120 per mm$^2$. These heat shields make possible remarkable improvement in the performance of tube furnaces and other reactors used in processing silicon wafers and other electronic components.

30 Claims, 2 Drawing Sheets

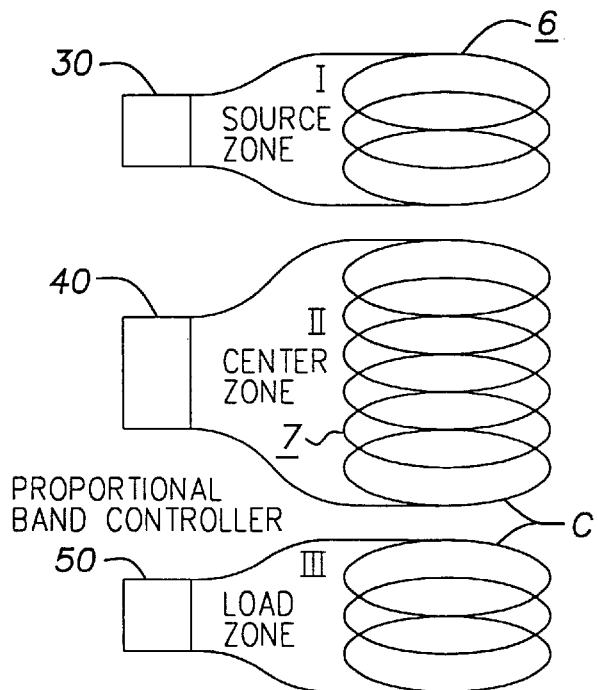
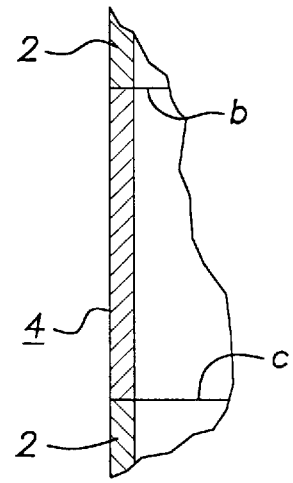
FIG. 4
FIG. 5
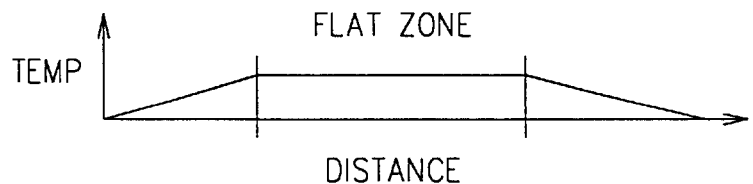
FIG. 7
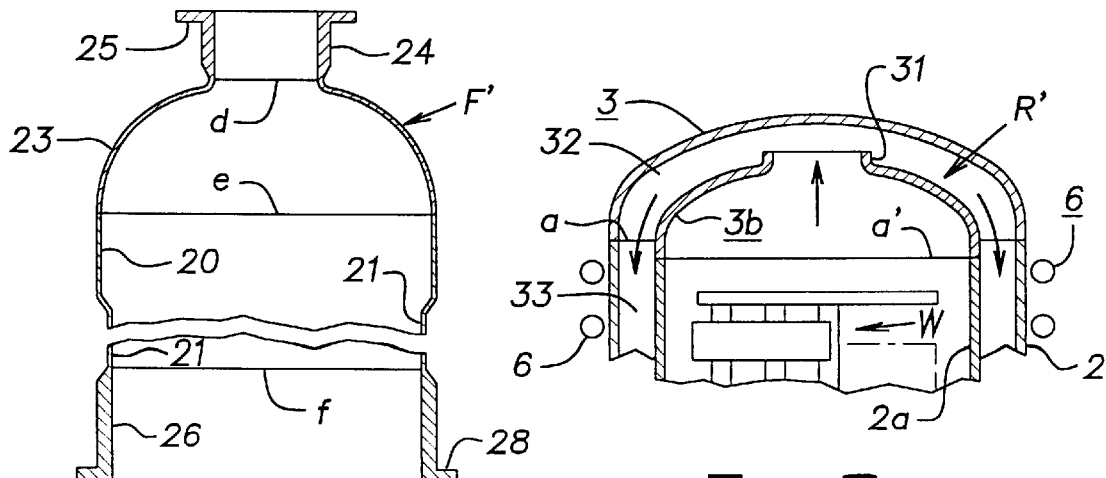
FIG. 6
FIG. 8

QUARTZ GLASS PRODUCTS AND METHODS FOR MAKING SAME

This application is a continuation-in-part of application Ser. No. 08/269,002 filed Jun. 30, 1994, now abandoned, and the continuation thereof application Ser. No. 08/804,234, filed Feb. 22, 1997, now U.S. Pat. No. 6,012,304.

The present application relates to the manufacture of quartz glass products having new or improved properties and to novel processes for making such products from porous silica preforms. One preferred embodiment of the invention involves nitrided vitreous quartz products with outstanding physical properties. Another embodiment involves the use of the quartz glass products of this invention in connection with furnaces or high-temperature equipment, particularly in the semiconductor industry. Other embodiments relate to opaque or porous silica glass products that can function as insulation or radiation heat shields. One favored embodiment of the invention involves the use of refractory dopants, such as silicon carbide, silicon nitride, silicon oxynitride or other suitable metal nitrides.

BACKGROUND OF THE INVENTION

It has been known for many years that nitrides of silicon have properties different from silicon dioxide and that some of these properties might be advantageous in certain applications. Silicon nitride and silicon oxynitrides can be produced in various ways as by reaction of silicon and/or silicon dioxide with ammonia, and products of this type would have utility for some special applications.

However, as pointed out in more detail in said copending application, there are many reasons why the commercial use of such products has been very limited, why research relating to nitrided silicon products has not been extensive, and why large capital investment for research and development in this area did not appear to be justified. It is difficult and expensive to produce silicon nitride products or silicon oxynitride products. Silicon dioxide (silica) does not react readily with nitrogen, although it is possible with appropriate reaction conditions to produce oxynitrides by reacting particles of silica with anhydrous ammonia.

Prior to the present invention, the presence of significant amounts of chemically-bound nitrogen in a quartz glass used in semiconductor manufacture would have been considered highly undesirable. Nitrogen heretofore appeared to be an impurity to be avoided.

The percentage of the nitrogen impurity in a commercial quartz glass is low but is not often measured or reported because of the difficulty of ascertaining the nitrogen content with reasonable accuracy. The analytical detection problem is another good reason why the unusual properties and advantages of chemically-bound nitrogen were heretofore not understood nor appreciated in the glass industry.

For several decades vitreous silica products essentially free of crystalline silica have been used extensively because of exceptional thermal shock resistance and other advantageous physical properties. However, these products have a limited useful life when heated above 1200° C. and other disadvantages because of limited resistance to deformation, the devitrification of the glass, and the damage resulting from the crystallographic alpha-beta inversion during heating and cooling of the devitrified glass. There has been a need for a practical solution to these problems for several decades, particularly the devitrification problem, but no simple solution was found prior to the present invention.

From the early 1960's to about 1990, horizontal tube furnaces were mainstay equipment in the semiconductor industry for oxidation of silicon, diffusion, heat treating and various deposition processes. They are sometimes called simply "diffusion furnaces" but the more correct generic term is a tube furnace.

An important part of processing equipment is the reaction chamber. The associated process tube and wafer carriers can be formed of silicon carbide or high-purity quartz glass. Silicon carbide is a superior material because it is structurally stronger, has a longer useful life, and does not break down with repeated heating and cooling; but the use of silicon carbide tubes and wafer boats has been slowed down because of cost and weight.

Quartz is highly purified glass favored for its inherent stability at high temperatures and its cleanliness. Drawbacks to this glass are its fragility and the tendency to break up and sag after extended use at temperatures above 1200° C. The breakup or devitrification of the quartz results in small particles or flakes of the quartz tube falling onto the silica wafers. Sagging can impede the placement of the wafer holders or cassettes in and out of the tube.

Vertical tube furnaces have smaller cleanroom foot prints, are better suited to automation, and offer other advantages over horizontal furnaces. The vertical furnaces are preferred for a number of wafer treatment processes including chemical vapor deposition (CVD).

The semiconductor industry is continually striving for greater uniformity and higher process yields. In order to achieve more precision and greater efficiency, the furnaces, reactors and other high-temperature equipment need proper non-contaminating insulation and more efficient means for reducing radiation heat losses. Prior to the present invention, the attempts to meet these needs have been crude and generally unsatisfactory.

SUMMARY OF THE INVENTION

One preferred embodiment of the present invention relates to the nitriding or nitridation of porous silica preforms and involves new technology which appears to be a giant step forward and a breakthrough of potentially great importance in the field of nitrogen-containing silica or silicon oxynitrides. Incredible improvement in the physical properties of a high-purity quartz glass can be obtained by incorporating a minute amount of chemically-bonded nitrogen in the silica.

That first embodiment is remarkable not only because of the difficulty in forming substantial amounts of chemically-bound nitrogen but also because of the difficulty in measuring or detecting the amounts being formed or in ascertaining any benefits therefrom. The improvement obtained in the resistance of quartz glass to devitrification was quite unexpected.

In describing said first embodiment, said copending application Ser. No. 08/269,002 abandoned sets forth different methods for nitridation of silica preforms as described hereinafter. One favored method can be carried out in a single induction furnace wherein the silica preform is heated in nitrogen from a temperature below 1400° C. to a temperature preferably above 1700° C. Another method comprises a two-stag process wherein the silica preform is first nitrided at a lower temperature, such as 1000° C. to 1200° C., and is later sintered to high density.

Use of Refractory Dopants

A second preferred embodiment of the invention relates to the use of special refractory dopants or additives to alter and modify the molecular structure and improve the physical properties of sintered quartz glass. Nitrogen-modified and carbon-modified silica glass made according to the invention can be provided with improved resistance to devitrification and increased high-temperature viscosity or sag resistance. The preferred refractory dopants are carbides and nitrides of silicon, such as silicon carbide, silicon nitride or silicon oxynitride. Silicon nitride is a preferred dopant, but nitrides of calcium, aluminum, chromium, titanium and other metals may also be advantageous.

A suitable refractory composition for making nitrided quartz glass articles could, for example, consist essentially of micronized particles of vitreous silica and a small amount (e.g., 0.01 to 0.3 percent by weight) of submicron particles of silicon nitride or other metal nitride that can release nitrogen for reaction with silica during the sintering operation.

Nitridation of the quartz glass in an induction furnace can be effected as the silica preform is heated from 1400° C. to 1700° C. or above in helium or in a vacuum because of the nitrogen released by the metal nitride. However, it is usually desirable to sinter the silica preform in nitrogen or a predetermined mixture of nitrogen and helium.

Gel Casting

In the practice of the present invention, it may be desirable to employ a gel-casting process in making the porous silica preform. Such a process based on ethyl silicate (TEOS), is suitable for production of high-purity quartz glass and is disclosed in some detail in parent applications Ser. Nos. 08/269,002 now U.S. Pat. No. 07/767,691; U.S. Pat. No. 5,389,582 and 08/804,234 U.S. Pat. No. 6,012,304. That disclosure is incorporated herein by reference and made a part of the present continuation-in-part patent application.

TEOS Impregnation

A third preferred embodiment of the present invention involves the impregnation of the porous silica preform formed by slip casting, isostatic pressing, electrophoretic deposition or gel casting, for example. After drying and firing, the preform is soaked in or thoroughly impregnated with a suitable silica sol (e.g., a hydrolyzed silicon compound, such as TEOS) as described in said copending applications Ser. Nos. 269,002 and 07/767,691 U.S. Pat. No. 5,389,582. It is then gelled, dried and fired before a subsequent nitriding treatment or a final sintering in an induction furnace.

It has been discovered that such impregnation of the porous preform with a hydrolyzed silicon alkoxide (e.g., ethyl silicate) provides remarkable advantages in the commercial manufacture of transparent quartz glass receptacles, such as crucibles, bell jars and acid tanks. For some reason such treatment of the preform improves the purity of the product by helping to remove sodium ions and other metal ions. It also facilitates the sintering operation and makes it possible to minimize the formation of gas bubbles in the glass during the final helium sintering operation.

The larger pores of a slip-cast silica preform are more apt to cause significant gas bubbles in the sintered glass. These large pores soak up the hydrolyzed alkyl silicate and permit gelling thereof inside the pores. The result of the alkyl silicate impregnation seems to be smaller and more uniform pore size, better suited to the production of transparent quartz glass which has a minimal bubble content.

The present invention provides a process for producing quartz glass of extremely high quality. The sintering of the TEOS-impregnated silica preform can be carried out in two stages in two different furnaces over a substantial period of time rather than in a single induction furnace in 6 to 12 minutes or so. In the first stage, the preform is sintered for a substantial period of time, such as 30 minutes to 3 hours or more, at a high temperature, such as 1400° C. to 1500° C., to cause a substantial increase in the density of the preform and/or to seal the pores thereof. Unlike the rapid sintering provided in an induction furnace, according to said U.S. Pat. No. 4,072,489, which is non-uniform and intended to provide a temperature gradient, the first stage of the sintering causes relatively uniform heating of the silica and promotes formation or cells with a more uniform pore size.

After a first-stage sintering to a higher density, such as 90 to 95 volume percent, the densified glass article can be placed in the conventional induction furnace and sintered to full density in an inert atmosphere. The temperature can be raised to about 1750° C. to melt and eliminate unwanted cristobalite.

In the first stage, the sintering can be carried out in a vacuum at a suitable low pressure (preferably below 5 torrs) or in an atmosphere of helium. In the second stage, after the pores have been sealed, argon or other inert gas can be provided in the induction furnace. If the pores contain helium gas only, it will escape to permit formation of substantially bubble-free full-density glass. A two-stage sintering process according to this invention is effective in producing transparent glass and is also useful in the manufacture of white (opaque) nitrided quartz glass (See Example II).

The process of this invention can also be modified to produce nitrided quartz glass that is clear or semitransparent by employing hot isostatic pressing to compress or remove nitrogen-containing gas bubbles.

Nitrided Glass

In carrying out the invention of said first-named embodiment, a shaped silica body or preform with a porosity of 10 to 40 volume percent can be formed from a refractory silica composition or a slurry of fine silica particles by slip casting, gel casting, electrophoretic deposition, isostatic pressing, injection molding or other suitable method (see U.S. Pat. Nos. 3,222,435 and 3,619,440). The porous silica preform can be formed and treated in such a manner that, after drying and firing, it contains a substantial amount of chemically-bound hydroxyl groups and/or other suitable reaction-promoting groups or ions (e.g., at or near the inner surfaces of the voids or pores). These groups or ions are usually hydroxyl groups or calcium ions. The fired porous silica preform is then nitrided in an appropriate manner (e.g., in an atmosphere of nitrogen in an induction furnace heated to 1700° C. or higher or in an atmosphere of anhydrous ammonia maintained at a suitable high temperature). To assure that the pores of the preform are filled, a substantial vacuum can be employed to remove air or other gas from the pores of the preform before nitrogen gas or other nitrogen-containing gas is introduced to those pores. Also a pressure differential can be provided to force the nitrogen gas through the porous preform.

The final sintering of the preform to a high density, such as 98 to 99 weight percent, can be carried out in an electric induction furnace generally as disclosed in U.S. Pat. No. 4,072,489 using a nitrogen atmosphere rather than an atmosphere of helium. The glass is usually heated to at least 1700° C. during sintering and is preferably heated to about 1750° C. or above the melting point of cristobalite to eliminate crystalline silica.

Optionally, the porous silica preform can be treated prior to nitridation to obtain improved results. The treatment can include impregnation with a hydrolyzed silicon alkoxide as described in copending applications Ser. Nos. 07/767,691 U.S. Pat. No. 5,389,582 and 08/269,002, abandoned and can include a hydroxylation treatment to increase the number of hydroxyl groups. In one embodiment of the invention, the porous preform is heated in a furnace atmosphere of air or oxygen and steam to a high temperature, such as 400° C. or higher to increase the hydroxyl content of the glass prior to the the nitriding step.

Parent application Ser. No. 08/269,002 abandoned describes a preferred embodiment of the invention wherein a preform comprising a porous silica body is made by shaping a refractory composition comprising essentially fine particles of high-purity silica and the shaped preform is then fired at at temperature of at least 1000° C. Thereafter the fired silica preform is heated in a furnace in a nitrogen atmosphere to a sintering temperature above 1600° C. while the pores are filled with nitrogen gas.

This process of nitridation is characterized in that the fired silica preform preferably contains chemically-bound hydroxyl and/or calcium ions that promote nitriding and provide a multiplicity of closely spaced accessible reduction sites scattered throughout the preform and located at or near internal pore surfaces of the preform contacted by the nitrogen. During the final sintering operation, normally carried out in an induction furnace, the preform is heated to a temperature of 1700° C. to 1750° C. or higher in such manner as to cause reaction at said reduction sites and to provide the quartz glass with an effective amount of chemically-combined nitrogen no less than 25 parts per million (ppm) and preferably 40 to 50 ppm or more.

This type of process is attractive for commercial manufacture because of its simple and economical nature. The preform is preferably made from an aqueous slurry or slip and is preferably formed by slip casting. In order to provide calcium ions to promote nitridation of the silica, the slip casting molds are preferably formed of gypsum or hydrated calcium sulfate and the slips used for casting can contain small amounts of calcium, preferably at least 2 or 3 ppm and no more than 20 ppm.

The present invention involves a remarkable discovery that nitridation of a silica preform can be effected in a similar way in an induction furnace by an alternative process wherein the preform is heated to 1700° C. or above in an atmosphere of helium or argon, rather than in a nitrogen atmosphere. In the alternative process the high-purity silica slurry or slip used to make the preform preferably contains micronized particles of silicon nitride or other suitable metal nitride that are uniformly distributed throughout the slip, preferably by milling the slip for 24 to 30 hours or more. Such particles preferably have an average particle size below one micron when manufacturing dense quartz glass products with a density greater than 90 percent.

The alternative process using a refractory dopant, such as silicon nitride or silicon carbide has special advantages when used to make quartz glass products of low density because of the unique ability to liberate gas as the silica approaches or reaches the melting point and to form a closed-cell structure with bubbles of substantial size.

Silicon nitride and silicon carbide particle additions are also advantageous when making quartz glass products with a higher density. The use of such refractory dopants may be a major breakthrough in the field of quartz glass and a giant step forward because of its potential for producing various types of engineered glass products with special utility. It appears that silicon nitride is particularly well suited for nitridation of silica because of its ability to release or produce nascent nitrogen at a time when the chemical bonds between the silicon and oxygen atoms of the silica are weakened by heat and vulnerable to reaction.

In the practice of this invention, it is usually desirable to employ silicon nitride particles having an average particle size of from about 0.2 to about 2 microns, but it is sometimes preferable to employ smaller particles with an average particle size of 0.1 micron or less to produce quartz glass with gas bubbles of small size. The silicon nitride particles can be of submicron size or colloidal size.

Other methods may be employed to provide quartz glass with a large number of small bubbles in a somewhat similar way. In another embodiment of this invention, small particles of an organic or combustible carbon compound are thoroughly mixed and dispersed in the silica slip or slurry before molding or casting the silica preform. The organic material should be compatible in the process and capable of being uniformly dispersed to provide a suitable suspension or dispersion. Various carbon compounds or binders can be used including polystyrene, starch, vinyl resins, microcrystalline cellulose, and the like.

Other embodiments of the invention relate to improvements in tube furnaces and other high-temperature equipment employed in the semiconductor industry which incorporate quartz glass components made in accordance with the invention. The processing operation in a tube furnace is more economical and efficient and can be greatly improved when the quartz furnace tube is provided with a cup-shaped end cap formed of special opaque quartz glass made according to the present invention. Such an end cap can provide a remarkably effective radiation heat shield in apparatus of the type illustrated in FIG. 1 of the drawings. Radiation heat transfer can be further reduced when portions of the quartz tube are also made of special quartz glass as illustrated in FIG. 1.

A number of unique and remarkable products can be produced when practicing the present invention. Special quartz glass products made according to the invention exhibit remarkable physical properties and can be of great commercial value. The nitridation of a porous vitreous silica preform in accordance with the invention apparently causes nitrogen atoms to become chemically bonded to silicon atoms of the vitreous silica, thereby effecting a remarkable change in the physical properties of the quartz glass even when the nitrogen content is barely measurable (e.g., below 0.005 percent by weight).

The resistance of the quartz glass to devitrification at high temperatures (e.g., 1100° C. to 1300° C. or higher) can be drastically improved by nitridation, perhaps more than fifty-fold and possibly two orders of magnitude. At the same time the high-temperature viscosity or resistance of the glass to deformation at high temperatures, such as 1250° C. or higher, can be increased dramatically (e.g., 50 to 100 percent or more). Because of their remarkable properties, special quartz glass products made according to the invention are valuable for a wide variety of uses in the chemical and electronic arts and other scientific arts and include hell jars, crucibles, furnace tubes, tanks, trays, and plates and tiles for furnaces, reactors and hot-wall applications. Such products are particularly useful in the semiconductor industry and the field of microelectronics because of extreme purity, uniformity and reliability.

The opaque nitrided quartz glass of this invention is particularly valuable for radiation heat shields used in CVD furnaces for chemical vapor deposition and in epitaxy reactors, diffusion furnaces and other furnaces used in the semi-conductor industry. Such glass is extremely well suited for such uses.

Clear or semitransparent quartz glass which has been nitrided during sintering according to the present invention and then pressurized by hot isostatic pressing or in a hipping furnace has great potential because of improved resistance to sag and devitrification. Such nitrided quartz glass can be used, for example, to make furnace tubes with increased useful life.

BRIEF DESCRIPTION OF THE DRAWINGS

FIG. 4 is a schematic view on a reduced scale showing heating coils and associated control means for a three-zone tube furnace;

FIG. 5 is a fragmentary sectional view showing a portion of the furnace tube of FIG. 1;

FIG. 6 is a shortened vertical section view showing another quartz glass product for the semiconductor industry;

FIG. 7 is a graph showing a typical temperature profile for a three-zone tube furnace; and FIG. 8 is a fragmentary schematic vertical sectional view showing a mollification of the vertical tube furnace of FIG. 1.

DEFINITIONS AND TERMINOLOGY

Figure 1:
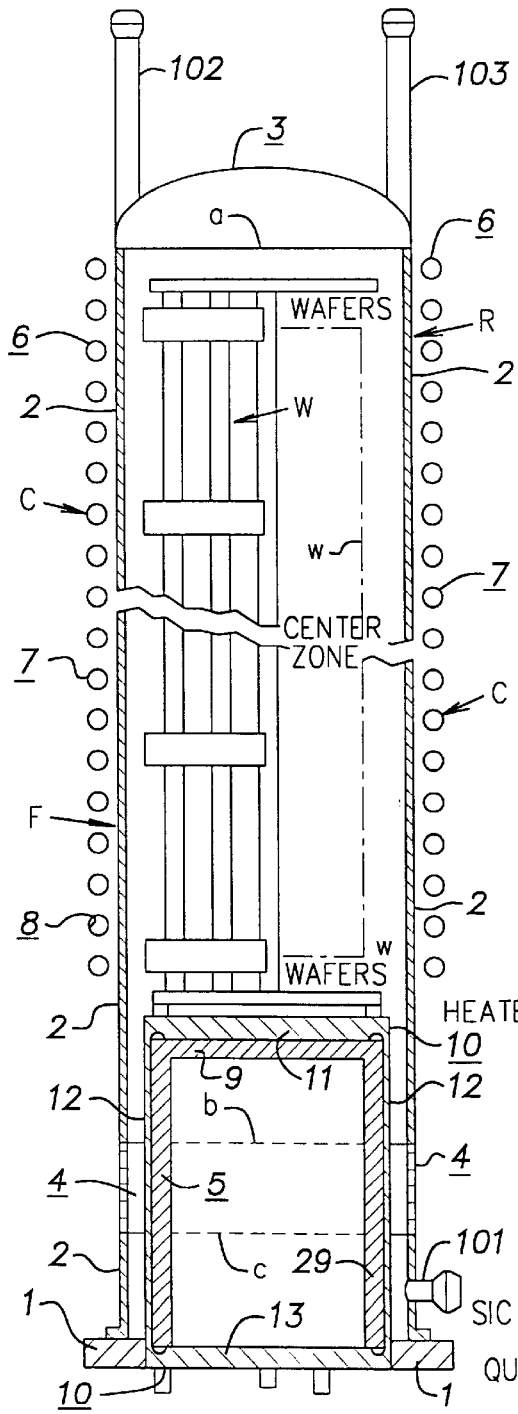
FIG. 1 is a shortened schematic vertical sectional view on a reduced scale with parts omitted showing a portion of a vertical tube furnace with the wafer holders or cassettes in place within the furnace tube, the outline of the silicon wafers being shown in broken lines.
Figure 2:
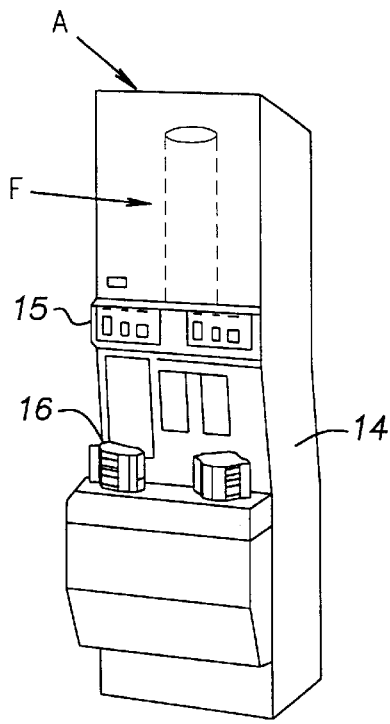
FIG. 2 is a perspective view on a smaller scale showing a conventional vertical tube furnace for processing silicon wafers with the vertical process tube shown in broken lines.

This invention is concerned with fused quartz and quartz glass containing a high percentage of silica as can be produced from quartz sand or from synthetic quartz of even higher purity. Quartz glasses commonly contain 99.5 to 99.99 percent by weight or more of silica and rarely contain more than one percent by weight of other compounds. The term "quartz", as applied to glass, excludes high-silica glasses, such as Vycor, containing 96 percent by weight of silica.

The term "high-purity quartz" as used herein refers to fused silica or quartz glass containing more than 99.99 percent by weight of silica and no more than about 50 parts per million (ppm) of contaminating metallic ions. The term "ultra-pure" as applied to silica or synthetic quartz glass suggests a silica content of at least about 99.998 percent by weight.

The term "refractory" as used herein with respect to a glass or glass composition indicates the ability of the glass to withstand temperatures as high as 1500° C. as are encountered in the casting of iron.

The dictionary term "micronized" is used herein with respect to particles which have been ground or pulverized to provide an average particle size no greater than 20 microns.

The term "sintering temperature" is used herein to indicate a temperature of at least 1400° C. sufficient to cause the silica of the porous preform to coalesce, to cause the pores of the preform to close, and to obtain a high density.

As used herein, the term "colloidal silica" refers to extremely small silica particles having an average particle size of from 1 to 200 namometers (i.e., less than 0.2 micron).

The term "high-porosity" as applied to a silica preform relates to the total volume of the pores or internal cavities rather than the width or diameter of the pores and suggests a porosity of from 25 to 30 volume percent or greater.

The term "transparent" as applied to sintered quartz glass is used in the normal sense to define clear full-density glass and does not imply glass approaching optical grade. The term covers helium-sintered glass containing a large number of bubbles with a diameter of from 1 to 10 microns and a substantial number of larger bubbles including some that are readily visible.

The term "high-temperature viscosity" as used herein with respect to quartz glass refers to the resistance to flow under applied stress of the glass at a temperature of about 1250° C. to about 1500° C. 1250° C. to about 1500° C.

It will be understood that a quartz glass that is nitrided to provide a "high resistance to devitrification" has a rate of devitrification at 1400° C. less than one-fourth that of a typical high-purity quartz glass.

As used herein, the term "effective amount" describes the amount of chemically-combined nitrogen in nitrided quartz glass which will provide a major and very substantial improvement in the high-temperature viscosity and other physical properties of the glass including a high resistance to devitrification.

The term "internal pore surface" indicates a surface or surface portion at a void or pore of the porous silica body.

The term "accessible reduction site" is used herein to describe the location of a site on a molecular scale where a reduction-type reaction can occur at a silicon atom of the silica to bond that atom to a nitrogen atom obtained from or liberated from nitrogen gas or a silicon-nitrogen compound, such as silicon nitride. The reduction may perhaps involve a transfer or sharing of electrons as in an isomorphous substitution of a nitrogen atom for an oxygen atom that results in a covalent bond of that nitrogen atom to a silicon atom of the silica. The exact nature of the nitriding is not fully understood.

The term "reactive" is used loosely with respect to hydroxyl groups or halogen ions that promote nitridation of the silica and chemical bonding of nitrogen atoms to silicon atoms because the exact mechanism is unknown or to some extent unproven. One can theorize that the hydroxyl ion or calcium ion may be positioned so as to weaken the covalent bond between a silicon atom and an oxygen atom. These ions may serve to catalyze the nitriding reaction.

It will be understood that, unless the context suggests otherwise, parts and percentages are by weight rather than by volume.

The terms "major portion" and "minor portion", respectively, are used herein in the normal sense to indicate amounts greater than or less than 50 percent by weight.

The term "dispersion mill" is used herein in its usual sense to describe mills of a type commonly used for dispersing particles in a slurry including conventional Kady mills and grinding mills, such as an attritor or planetary mill. A Kady mill is provided with a slotted rotor and slotted stator that effect rapid grinding or dispersion of particles by a shearing-type action.

Attritor milling is commonly performed by impellor stirring of a suspension containing at least about 50 percent by weight of a liquid, such as water, and at least 30 percent of milling media, such as 1 to 1.5 millimeter balls having a hardness greater than the material to be ground. Impeller stirring of the solution at a high speed, such as 1000 rpm, can, for example, pulverize the silica particles of an aqueous slurry and reduce the particle size to 2 microns or less in a very short period of time. In the practice of this invention the attritor mill preferably employs balls of partially-stabilized zirconium (PSZ) as the milling media.

The term "comprising essentially" is used herein in the normal broad sense to describe refractory compositions that contain vitreous silica as the main ingredient and that are suitable for making quartz glass. That term does not exclude tolerable but significant amounts of compatible refractory dopants that do not change the essential character of the quartz glass (e.g., up to 0.3 percent by weight of dopants, such as silicon carbide (SiC) or silicon nitride ($Si_3N_4$)).

The term "average particle size" as used herein is determined on the basis of weight percent rather than the number of particles. If the "average" particle size of the silica is 5 microns, 50 percent by weight of the silica particles have a size less than 5 microns. The particle distribution on a weight basis can readily be determined using a well-known modern scientific measuring instrument, the SediGraph 5100, which produces a computerized analysis based on a scan of a liquid suspension or slurry. The terminology used herein is intended to be consistent with that commonly used in the art in connection with that measuring instrument.

The term "silicon nitride" is used herein in the broad sense and includes partially nitrided silicon particles containing a major amount by weight of $Si_3N_4$.

The term "silicon carbide" is used in the broad sense and includes silica particles having a major portion by weight of SiC produced by reaction with carbon.

The bubble population in a quartz glass is estimated or described herein in terms of "population density" or bubbles per square millimeter as can be observed under a microscope on a flat polished surface of a substantially homogeneous quartz glass specimen.

The term "cullet" is used herein in the broad sense to cover pieces of clear or opaque quartz glass or equivalent quartz glass, which is normally milled for 10 hours or more, and excludes soft slip-cast silica scraps (obtained before or after the initial firing) which has not been sintered and can be micronized in a few hours.

The term "ramped" is used herein as it is understood in the art to indicate an increase or decrease in the furnace temperature.

The term "microscopic" is used herein to indicate a minute or extremely small size.

The term 'devitrification' is used herein to indicate a phase chance from the vitreous to the crystalline state.

The term "average bubble size" is used herein in the normal sense to describe the bubble size of glass as determined by scientific image analysis of a polished specimen (e.g., at 100×) using well-known and commonly used instruments, such as the Bausch & Lomb RESEARCH II metallograph, that views the glass specimen, and the Buehler OMNIMET, a computerized image analyzer that receives information from the metallograph.

Hot isostatic pressing, identified as HIP, is a method employed to densify, compact, compress and/or strengthen a product by a combination of heat and pressure. It can also be used for diffusion bonding. The method commonly involves the use of temperatures from 1000° C. to 2000° C. and pressures from 40 to 4000 atmospheres (600 to 60,000 psi), but lower temperatures and lower pressures can be employed for some applications. Some HIPing furnaces permit use of pressures of 75,000 psi or higher.

Commercial materials currently processed by HIP include superalloys, titanium, stainless steel, silicon nitride, alumina, soft ferrites, cemented carbide, and carbon composites.

Sintering methods are commonly combined with HIPing, either as an additional step (called sinter plus HIP) involving separate furnaces, or as one single step (called sinter/HIP) in a single furnace. Sinter plus HIP has been used to densify a wide range of materials, including silicon nitride, electronic ceramics and superconductors, and in many cases a container is not required. Sintering alone cannot fully densify some of these materials.

A process similar to sinter HIP is gas pressure sintering (GPS), which does not require a container. GPS is an economical alternative to HIPing, especially for sintering $Si_3N_4$ products with complex shapes. GPS is often carried out in an atmosphere of argon or other inert gas at pressures from 10 to 100 atmospheres (i.e., 1 to 10 MPa).* It can also be carried out at much higher pressures.

Sinter/HIP furnaces can be designed to permit sintering at high temperatures, such as 1400° C. to 1800° C., and at high pressures, sometimes in excess of 1000 atmospheres. The less expensive furnaces often operate at pressures below 100 atmospheres. For example, a furnace made by Advanced Vacuum Systems, Inc., of Ayer, Mass. (AVS), identified as Sinter-HIP Model SH-4, is designed for manufacture of cemented carbide products from tungsten-cobalt alloys and provides pressures up to 60 atmospheres (about 6 MPa). This AVS furnace and many other sinter/HiP furnaces available commercially can easily be modified or adapted for manufacture of sintered quartz glass products according to the present invention.

When describing the characteristics of sintered quartz glass that has good optical quality, the expression "total inclusion cross section" defines the sum of the cross-section in square millimeters ($mm^2$) of bubbles or inclusions per 100 cubic centimeters ($cm^3$) of glass. Negligible inclusions or bubbles smaller than 0.10 mm. in diameter are disregarded.

The term "maximum inclusion" refers to the diameter of the largest single bubble or inclusion in any one 100 $cm^3$ of glass.

The term "optical grade" is used herein in the broad sense to indicate a transparent homogeneous quartz glass with good optical qualities that has a maximum inclusion no greater than 4 millimeters. The present invention makes it possible to produce optical grade glass economically by sintering porous shaped preforms in helium without HIPing.

*MPa is the standard abbreviation for mega pascals.

DESCRIPTION OF PREFERRED EMBODIMENTS

The present invention is particularly concerned with the manufacture of high-purity vitreous silica or quartz glass products from refractory silica compositions which are molded and sintered to density the glass. The methods and apparatus used in the practice of the invention may be similar to those described in U.S. Pat. Nos. 4,072,489 and 5,053,359.

The invention involves formation of a shaped porous silica body or preform from a refractory composition or a slurry of fine silica particles by slip casting (See U.S. Pat. No. 4,072,489), by hot isostatic pressing, by electrophoretic deposition, by injection molding (See U.S. Pat. No. 3,222, 435) or by other suitable methods (See U.S. Pat. No. 3,619,440). A freeze-casting or gel-casting process can also be employed.

High-purity silica or fused quartz may be pulverized, micronized or reduced to appropriate micron size as described in U.S. Pat. No. 4,072,489 while maintaining the desired purity. A slurry or slip containing micronized particles of high-purity silica is preferably prepared by wet milling in a conventional ball mill having balls or stones formed of essentially pure fused quartz. The liquid employed during milling is preferably distilled water rather than an organic liquid. After milling, the average particle size of the silica particles is from 2 to microns.

In the practice of the invention, it is usually preferable to employ high-purity silica or fused quartz with a silica content of 99.99 percent or higher. Natural or synthetic silica with a reported $SiO_2$ content of at least 99.999 percent by weight is available commercially. Such ultra-pure silica can be produced by hydrolysis of silicon tetrachloride or ethyl silicate (TEOS). Extremely pure silica can also be produced from high-purity quartz sand that has been treated to remove impurities.

A sol-gel process can be used to form synthetic vitreous quartz of high purity from a silicon compound, such as silicon tetrachloride or a silicon alkoxide. A sol prepared from the silicon compound may be hydrolyzed to form a solution which is thereafter polymerized to form a silica gel.

The silicon compound is preferably an organo-silicate or alkoxide, such as methyltrimethyloxysilane, tetraethyl orthosilicate (TEOS), tetramethyl orthosilicate (TMOS) or other alkyl silicate (e.g., propyl silicate). Various organic compounds that can be used in the practice of the invention are disclosed in U.S. Pat. No. 4,789,389 and have the formula $Si(OR)_4$ or $Si R(OR)_3$ where R is an alkyl group.

Ethyl silicate, for example, can be synthesized from silicon tetrachloride and anhydrous ethyl alcohol. Partially hydrolyzed ethyl silicate (TEOS) is available commercially (e.g., SILBOND, a product of Silbond Corporation), and can be used.

A silicon alkoxide, such as ethyl silicate, can be hydrolyzed in the presence of an acid or base. The reaction can be described by a simple formula where 1 mole of ethyl silicate plus 2 moles of water theoretically produce 1 mole of silicon dioxide and 4 moles of ethanol, but actual hydrolysis is not this simple. Many intermediate species of polysilicates are formed during hydrolysis which grow in chain length until most or all of the ethyl groups are driven off and a non-linear network of —Si—O—Si— remains. After the hydrolyzed ethyl silicate is gelled and dried, it forms silica.

Commercial ethyl silicate binders can be produced by partially hydrolyzing TEOS under carefully controlled conditions to provide a stable mixture of polysilicon-oxygen "prepolymers" which can be stored and subsequently hydrolyzed to completion by adding an appropriate amount of water and changing the pH to an unstable range by using a gelling agent.

The preparation of silica glass from silicon alkoxides is described in U.S. Pat. Nos. 4,622,056 and 4,789,389. The catalyst used for hydrolysis may be a base, such as ammonium hydroxide, or an acid, such as hydrochloric acid, nitric acid or formic acid. The gelling catalyst used to adjust the pH of the hydrolyzed alkyl silicate may be an acid or a base. Excellent results can be obtained using a weak base, such as morpholine, to effect gelling. Other bases which may be useful are disclosed in U.S. Pat. No. 4,680,048 (e.g., triethylamine, pyridine and aniline).

A preferred embodiment of the present invention relates to the manufacture of high-purity nitrided silica glass products. In this embodiment a silica body or preform with a substantial porosity is formed or molded to the desired shape, dried, fired in air or oxygen, and then nitrided to cause bonding of nitrogen atoms to silicon atoms of the silica. The nitridation of the silica preform can be carried out prior to or during sintering of the preform.

The silica of the preform is preferably a vitreous quartz of high purity and may have a purity in excess of 99.99 percent by weight. If the silica preform is formed by gel casting, a substantial portion of the silica can be formed from hydrolyzed ethyl silicate. Before the silica preform is sintered to high density, it can be fired for 2 to 10 hours in air at a temperature of from 800° C. to 1250° C. to oxidize the hydrocarbons or other combustibles. A normal firing might be for about 3 to about 4 hours at a temperature of from 1050° C. to 1200° C.

When making nitrided quartz glass products according to this invention, the porous silica preform is provided with or contains reactive or reaction-promoting groups, such as hydroxyl or halogen ions, which promote the nitridation of the silica at high temperatures. The amount of the hydroxyl groups or other reactive groups can be substantial, (i.e., at least 100 parts per million, ppm). That amount can be from 150 to 250 ppm. In order to provide an increased hydroxyl content, the porous silica preform can be hydroxylated with steam at a high temperature, such as 400° C. to 1100° C. or more.

When the hydroxylated silica preform is nitrided under suitable conditions as in a nitrogen-containing atmosphere, there is an increase in the amount of chemically-bound nitrogen. That amount should be an effective amount, no less than 25 ppm, and is preferably at least about 50 ppm. The nitridation can be carried out in such manner that the hydroxyl content is reduced.

A dramatic improvement in the physical properties of high-purity sintered quartz glass can be achieved with a minute amount of chemically-bound nitrogen (e.g., less than 0.01 percent by weight). The minimum amount depends on the intended use for the quartz glass product.

When the desired minimum nitrogen content in the glass product is 100 ppm or more, an adequate amount of calcium ions, hydroxyl ions or other reaction-promoting ions should be provided in the porous silica preform. For example, hydroxylation of the preform may be desirable to provide an hydroxyl content of 150 to 200 ppm or more prior to nitriding. It may also be desirable to slip cast the preform in a plaster of Paris mold using a slurry with a substantial calcium content, such as 10 to 15 ppm.

Nitridation of the porous silica preform can be achieved using a strong reducing agent, such as anhydrous ammonia, to provide a hydrogen-nitrogen reducing atmosphere. An atmosphere suitable for effective nitridation can be obtained from cracked ammonia. A reducing atmosphere consisting of a corresponding mixture of nitrogen gas and hydrogen gas would be less effective. The nitriding in the hydrogen-nitrogen reducing atmosphere can be carried out at a temperature of from 600° C. to 1300° C., preferably from about 900° C. to about 1100° C.

The partial replacement of surface hydroxyl groups with chlorine by a pretreatment step may enhance the nitriding reaction.

After the silica preform has been nitrided to provide the desired nitrogen-silicon bonding and the desired content of chemically-bound nitrogen, it is sintered to a high density, such as 98 to 99 percent. The final sintering may be effected in a conventional electric induction furnace at high temperatures, such as 1550° C. to 1750° C. Since the silicon-nitrogen bonds tend to be unstable at temperatures above 1500° C., it is desirable to carry out the final sintering operation in a nitrogen reducing atmosphere.

Nitrided quartz glass products made according to the present invention have remarkable physical properties even when the amount of chemically-bound nitrogen in the glass is very small. For example, the viscosity of quartz glass at 1260° C. can often be increased 50 percent or more by a nitriding treatment which provides the glass with a nitrogen content of less than 0.02 percent by weight. The same nitriding treatment may at the same time provide the quartz glass with an incredible increase in the resistance to devitrification.

FIGS. 1 to 6 illustrate the application of the present invention to improve the operation of tube furnaces in the processing of silicon wafers. The furnaces function generally in the manner described on pages 129 to 143 of the publication "Microchip Fabrication—A Practical Guide to Semiconductor Processing" (Second Edition, 1990) by Peter Van Zant (McGraw-Hill Publishing Co.). The furnace of FIG. 1 includes a three-zone reactor assembly R with a vertical furnace tube F surrounded by an electric heating coil assembly C which has conventional automatic controls (not shown) that typically include proportional band controllers (30, 40 and 50) that proportion power to the heating coils to maintain a constant temperature in the center zone (flat zone) of the reactor (See FIG. 7).

The reactor assembly R includes a flat base ring 1 connected to a cylindrical thin-wall quartz glass tube 2 having a cup-shaped top cap 3 and an opaque quartz glass sleeve 4 near the bottom outlet 101. As shown the reactor assembly includes two vertical gas pipes 102 and 103 to provide the desired gas flow. The opaque glass end cap 3 and sleeve 4 are welded to the tube 2 at the circumferential weld lines a, b, c.

A conventional wafer holder W formed of quartz glass is mounted on a hollow cylindrical quartz glass support or pedestal 10 that moves vertically into and out of the furnace tube 2. The wafer holder, also called a boat or cassette, has a multitude of slots to hold flat silicon wafers W in horizontal positions as shown in outline by broken lines in FIG. 1. The support 10 has flat circular top and bottom walls 11 and 13, a thin cylindrical wall 12 that fits the opening in ring 1, and a low-density quartz glass cup 5 with a flat circular top wall 9 and a cylindrical wall 29 that fit against the walls 11 and 12 to provide insulation.

The coil assembly preferably comprises three or more spiral coils of metal wire, each connected to a separate power supply operated by a proportional band controller or other suitable computerized temperature-responsive control means as described, for example, in the above Van Zant publication. An upper coil 6 has at least several convolutions located around the upper source zone I of the furnace tube. A similar lower coil 8 has at least several convolutions surrounding the load zone III, and a longer central coil 7 with many more convolutions surrounds the central zone II (or flat zone) which preferably extends vertically at least three-fourths of the length of the wafer holder W.

FIG. 6 shows a different type of furnace tube B having a thin-wall quartz tube 20 whose lower cylindrical portion 21 is reduced in diameter to fit an annular sleeve member 26 of greater thickness having a bottom horizontal flange 28. The furnace tube has a rounded thin-wall cup-shaped portion 23 welded to tube 20 at weld line e and welded to a thicker annular tube-shaped member 24 having a top flange 25. The top and bottom members 24 are 26 are formed of opaque quartz glass made by the process of this invention and are welded to the tube 20 at the horizontal circumferential weld lines d and f.

The reactor assembly R and its vertical furnace tube F are employed in a conventional vertical tube furnace A (FIG. 2), which is shown and described in said Van Zant publication. That furnace has a cabinet 14 with a control panel 15 and a cassette loading station 16. The furnace may be employed for different operations, such as oxidation, diffusion, or CVD. Different gases may be required to accomplish the desired reaction. Modern tube furnaces employ various types of automatic water loading.

The layout for robotic cassette-to-cassette loading as used on single-tube furnaces is shown on page 15 and described on pages 14 to 17 of the publication "European Semiconductor" (July 1991). The tube furnace assembly includes a furnace cabinet with a control panel and a cassette loading station and a separate source cabinet with associated cable and gas ducts extending between the two cabinets. Such a tube furnace is supplied by Tokyo Electron, LTd (TEL) and SVG Thermco, the world market leaders for vertical tube furnaces.

FIG. 4 is a schematic representation of the heating coils and associated control means of a typical three-zone tube furnace, and FIG. 7 is a graph indicating the temperature profile for that furnace. Both of these figures correspond to illustrations in the aforesaid 1990 Van Zant publication, which would apply to vertical tube furnaces as well as horizontal tube furnaces.

As shown in FIGS. 1 and 4, the reactor R has a vertical furnace tube F surrounded by a coil C comprising three separate spiral metal wires 6, 7 and 8 with convolutions of the same size evenly spaced along the length of three heating zones I, II and III. A typical furnace usually has 3 to 5 coils, each connected to a separate power supply operated by a proportional band controller or other computerized regulating means. As shown a source zone is heated by a metal coil 6 whose power supply is operated by a proportional band controller 30. Similar computerized temperature-responsive controllers 40 and 50 are provided for coils 7 and 8 of the center zone (or flat zone) and the load zone, respectively.

Conventional thermocouples (not shown) are positioned near or against the quartz tube 2 and send temperature information to the proportional band controllers. The controllers proportion electric power to the coils 6, 7 and 8 to heat the reaction tube. These controllers are sophisticated and can control temperatures in the center zone (flat zone) to plus or minus 0.5° C. in a typical furnace of the type described in said 1990 publication. However, the semiconductor industry strives for more accurate temperature regulation to increase yields of semiconductor products meeting modern standards of perfection.

Figure 3:
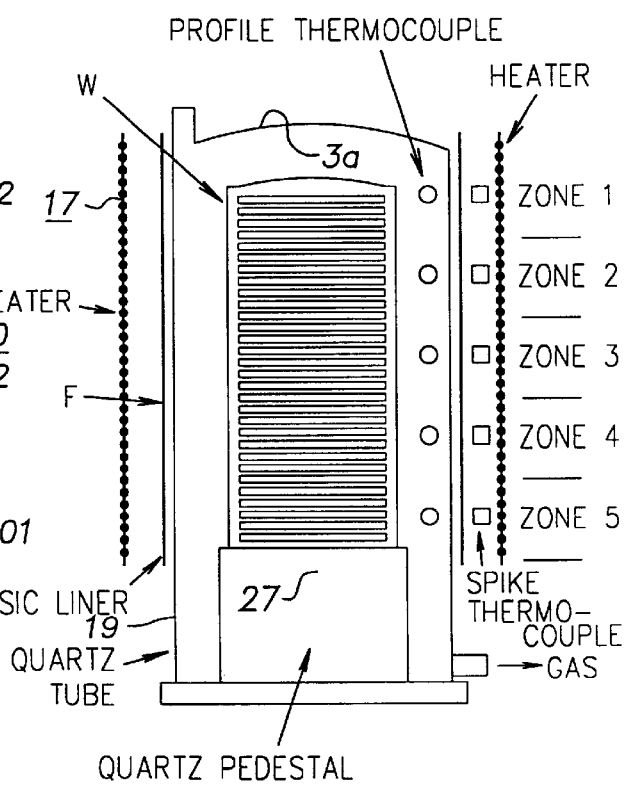
FIG. 3 is a schematic vertical sectional view on a reduced scale illustrating a typical five-zone vertical thermal reactor (VTR)

The heating means for the furnace F of FIG. 1 may be the same as or similar to that of the VTR furnace F' shown schematically in FIG. 3 and may include spiral heating coils (17) and a cylindrical silicon carbide liner (18) with associated spike and profile thermocouples located as shown.

If the furnace F or F' has 5 zones as shown in FIG. 3, it would, of course, have 5 proportional band controllers corresponding to the controllers 30, 40 and 50. The coil assembly C would then have 5 or more spiral coils of wire, and each of the 5 coils would be connected to a heat or power supply with its own proportional band controller (or computer controller).

The heating coils of the assembly C preferably comprise resistance heating wires formed of an iron-chromium-aluminum alloy which can tolerate temperatures of 1300° C. or higher, such as KANTHAL APM made by Kanthal Corporation.

It will be understood that the quartz furnace tube 2 (or 19) can have a length that is 3 to 10 times its diameter and may sometimes be large enough to treat 150 to 200 silicon wafers at a time. Such large wafer loads tend to cool the quartz glass process tube. A full load of 200 six-inch wafers could, for example, cause the tube temperature to drop at least 30 to 40 degrees C during loading.

The reactor assembly R of FIG. 1 may, of course, be modified in various ways and may, for example, be comparable to or equivalent to that shown schematically in FIG. 3. The reactor assembly R' shown schematically in part in FIG. 8 is a modified vertical tube (CVD) furnace designed specifically for chemical vapor deposition of silica. A vapor-containing gas for this purpose is typically produced by bubbling an inert gas, such as nitrogen or argon, through liquid ethyl silicate (i.e., TEOS).

The reactor R' of FIG. 8 is basically the same as the reactor R and of the same or comparable size, but the gas pipes 102 and 103 are omitted and there are a number of other changes as shown in the fragmentary view of FIG. 8.

The reactor assembly R' includes a vertical furnace tube comparable to the quartz glass tube F, a heating coil assembly C with three or more spiral coils (6, 7, 8) each connected to a separate power supply operated by a proportional band controller or the like as shown and described in connection with FIG. 4. Spike and profile thermocouples are provided as shown and described in connection with FIG. 3. The reactor R' can have three to five heating zones and can be substantially identical to the reactor R of FIG. 1 as previously described except for the changes shown and described in connection with FIG. 8.

It will be apparent that the furnace F of FIG. 1 can easily be modified to accommodate the modified structure shown in FIG. 8. The flat base ring corresponding to ring 1 would, of course, have a somewhat greater radial width to receive and support the annular flanged bottom ends of the concentric quartz glass furnace tubes 2a and 2'. The cylindrical wall 12 of the pedestal 10 that fits the circular opening of the base ring would, of course, be concentric to and of smaller diameter than the tube 2a, and the wafer holder W would also be of a size to move through that opening when it is retracted from the uppermost position shown in FIG. 8. The dimensions of the wafer holder W and the pedestal 10 relative to the furnace tube (2a) can be the same as shown in FIG. 1. However, the diameter of the coils 6, 7 and 8 would be increased relative to the first furnace tube 2a so that the coils surround the larger second tube 2' as in FIG. 8.

The lower portions of the tube 2a not shown in FIG. 8 can be the same as those of the tube 2 shown in FIG. 1 and preferably include an integral opaque quartz glass sleeve 4 near the outlet 101 that is identical to the sleeve described in connection with FIG. 1. An opaque quartz glass sleeve of the same composition can also be welded to and incorporated in the outer furnace tube 2' to provide a heat shield adjacent to the sleeve 4 of tube 2a.

Opaque sintered quartz glass end caps of the same composition as the end cap 3 of FIG. 1 are welded to the transparent quartz glass tubes 2a and 2' to provide radiation heat shields at the top of the reactor R'. The opaque end caps 3' can be of the same size and shape as the end cap 3 and is integrally joined to the clear tube 2' at the circumferential weld line a. A similar sintered opaque end cap 3b is integrally joined to the clear tube 2a at the circumferential weld line a'.

The end caps 3b and 3' are vertically spaced to define a closed chamber 32 above cap 3b that communicates with the annular space 33 defined by the concentric tubes 2a and 2'. The first furnace tube 2a has means forming an opening to allow the flow of vapor-containing gas from the interior of tube 2a downwardly through the space 33 to the gas outlet 101. As shown such means comprises an annular flange 31 at the center of the cap 3b defining a top circular opening that permits gas flow as indicated by the arrows.

The reactor R' is specially designed for deposition of silica on silicon wafers W that are supported in horizontal positions by the wafer holder W. The holder may, for example, support 100 to 150 or more wafers at a time. The vapor-containing gas is fed to the interior of the furnace tube 2a by a horizontal gas inlet means similar to and near outlet means 101 and flows upwardly into contact with the silicon wafers on the wafer holder and then through end cap 3b to the chamber 32 as indicated by the vertical arrow in FIG. 8. The gas is then caused to flow downwardly from chamber 32 as indicated by the arrows and to pass down through the annular space 33 to the gas outlet means 101 of furnace tube 2'. The gas inlet means 102 is omitted in the reactor assembly R' and replaced by a horizontal gas inlet means near outlet means 101 that extends through the wall of tube 2' and is welded to the wall of tube 2a.

FIG. 3 is a schematic view of a typical vertical thermal reactor, such as VTR 7000 supplied by Thermco Systems Division of Silicon Valley Group, Inc., as shown and described on pages 119 to 131 of the publication "Solid State Technology" (November, 1996).

A five-zone reactor is shown comprising furnace F' with conventional heater means including a coil assembly 17 (comparable to the assembly C), a cylindrical silicon carbide liner 18, a transparent high-purity quartz glass tube 19, and an associated top cap 3a comparable to the opaque end cap 3 of FIG. 1. As shown, a wafer boat W is supported inside the process tube 19 on a vertically movable quartz pedestal 27, which may be the same as or similar to the quartz glass pedestal 10. The wafer boat may be the same as or similar to the wafer holder W of FIG. 1 and may, for example, hold a stack of of 100 to 150 or more silicon wafers. The furnace tube 19 has a bottom gas outlet and a top gas inlet corresponding to the outlet and inlet 101 and 102, respectively.

As indicated on pages 119 and 120 of the aforesaid 1996 publication, the general reactor configuration for a VTR 7000 includes a process chamber made up of a high-purity quartz process tube (19), a wafer boat (w), and a pedestal (27). A hydrogen combustion system is housed in an externally configured heater means as described in said publication. The process chamber is positioned inside a helically-wound heater means with 5 control zones. A conventional silicon carbide liner is preferably positioned between the process chamber and the heater means. Gas injection is accomplished via mass flow controllers through a manifold assembly that directs process gases into the top of the process tube.

Furnace temperature is monitored and controlled by means of thermocouples located strategically to represent each of the 5 control zones of the heater means. "Spike" thermo-couples are positioned outside of the process chamber in close proximity to the heating coils in each of the 5 control zones. Readings from these spike thermocouples approximate the temperature of the heating coils at 17. "Profile" thermocouples are positioned inside the process chamber adjacent to the wafer stack, one in each of the 5 control zones. These profile thermocouples approximate the wafer stack temperature but may not be accurate indications of actual wafer temperatures.

For more than two decades the semiconductor industry has relied on proportional integral derivative (PID) algorithms to control indirectly the temperature of the silicon wafers based on the input from the thermocouples. As indicated in said 1996 publication (Solid State Technology) the industry standard PID control algorithm adds three terms together to determine the power applied to each zone of the heater means (at 17). Each term is a function of only the error (e) between the measurement and the setpoint for the control loop. The following mathematical formula is employed:

$$\text{Heater power} = K^* e + K_d^* de/dt + K_I^* \int e \, dt$$

The (first) proportional term acts as a primary negative feedback on the setpoint error. The (second) derivative term acts as a brake to reduce speed of response, and the (third) integral term acts to reduce steady-state offset in the error.

Although different strategies can be adopted on production furnaces (e.g., spike, profile, ratio and cascade strategies) as indicated in said 1996 publication, it is normal practice to use the spike thermocouples for control of power output. A spike thermocouple in its particular zone sees less effect of power in adjacent zones than the profile thermocouple. Therefore spike PID control can be tuned to respond much faster than profile or cascade control.

Profiling of a VTR furnace for a particular wafer treatment process with a specific number of wafers is standard procedure and well understood by furnace operators. The profile and spike readings are normally recorded in profile tables similar to those of Example IX, for example.

In the fabrication of semiconductor devises, oxidation and diffusion furnaces elevate the silicon substrates to a temperature sufficient to carry out diffusion of a dopant or oxidation or deposition on the surface. Typically, oxidation and diffusion furnaces are configured in a similar manner. The process temperatures can range from 700° C. to 1250° C.

In order to carry out a desired oxidation or diffusion process, silicon wafers are loaded into a quartz "wafer boat" which is advanced or "pushed" slowly into the furnace tube whose temperature is low enough to minimize stress damage to the wafers during the insertion. In the practice of the present invention using equipment of the type shown in FIGS. 1 to 5, the push temperatures preferably range from about 600° C. to about 800° C.

After the wafer boat is advanced to an operating position as shown in FIG. 1 or FIG. 3, the furnace temperature is "ramped" (increased) to the desired diffusion or oxidation temperature, and preferably allowed to stabilize. Then the oxidation or diffusion step is executed in an appropriate gas. An inert gas purge or anneal sequence then occurs, typically at the same temperature. This is followed by a temperature ramp down to the desired wafer extraction or "pull" temperature. The pull temperature is normally performed at the same temperature as the push. The wafer boat is then slowly removed from the furnace tube.

A typical vertical diffusion furnace, such as the furnace of FIG. 3, can process as many as 150 production wafers in a single batch. Improvements in the furnaces are urgently needed to meet the needs of next generation semiconductor devices. The experimental model-based temperature control (MBTC) system described in said 1996 publication (Solid State Technology) is one proposal to meet the need. The publication describes the problems and shortcomings of the standard PID system.

The present invention provides a simple and effective way to reduce these problems and to meet present and future batch manufacturing needs of the semiconductor industry. Horizontal and vertical tube furnaces modified in accordance with the invention function in a greatly improved manner. Important benefits result from tighter thermal uniformity, lower expenditure of thermal budget during ramps and stabilization, run-to-run repeatability, reliability and cycle-time reduction for selected wafer-treating processes. The invention is particularly advantageous for older three-zone thermal reactors using the standard PID control systems, but is also important in more sophisticated five-zone reactors, such as described in said 1996 publication.

The present invention is also important in the field of rapid thermal processing (RTP) where radiation heating equipment is employed to heat the wafer. RTP systems are single-wafer processors that employ automated wafer loading means to move silicon wafers, one at a time, into and out of the heating chamber or hot zone (See pages 143–144 of the aforesaid Van Zant publication).

In semiconductor manufacture, the ion implant process requires a follow-on heating operation, called annealing, to cure out crystal damage. In the past, the annealing step was carried out in a tube furnace, but the slow heating was undesirable in causing the dopant atoms to spread out on the silicon wafer. The RTP systems overcome this problem and are becoming increasingly important in the semiconductor industry for ion implantation and a range of other applications.

RTP technology relies on rapid radiation heating using heat sources, such as graphite heaters and plasma arc and tungsten halogen lamps. The halogen heating lamps are the most popular and are able to bring the upper wafer surface up to process temperature (e.g., 1000° C.) in seconds. Likewise cooling takes place in seconds. Optical pyrometers can provide rapid temperature measurement, but accurate temperature control is a problem.

The inherent low rate of production in single-wafer RTP systems is a serious disadvantage. If, for example, the cycle time is 90 seconds, almost 30 seconds may be required for advancing and retracting each wafer into and out of the heating chamber. It is possible to reduce the overall cycle time substantially by providing the opaque quartz radiation heat shield of this invention (e.g., quartz end cap 3 or 3a) at one end of the heating zone or heating chamber and another quartz heat shield below the heating chamber opposite the tungsten heating lamps.

The quartz glass heat shields of this invention are capable of reducing energy costs in RTP systems as well as in tube furnaces. The energy savings can be direct (as in Example IX) or indirect and can be remarkable when the quartz glass heat shield contains gas bubbles of the desired size and number. From the standpoint of heat loss, the equipment involved in Example IX is somewhat crude. Equipment of that type can easily be modified in accordance with the present invention to reduce energy costs greatly (i.e., by at least 15 percent). That is a conservative estimate as to potential energy savings. The total savings, direct and indirect, can be much greater, perhaps 25 percent or more, keeping in mind the excessive expense involved in water cooling and air conditioning equipment associated with conventional wafer processing furnaces and the excessive water consumption. The amount of water used in the semiconductor industry is incredible, perhaps approaching 2000 gallons per wafer. The present invention makes it possible to reduce the need for expensive air conditioning and water cooling while at the same time reducing direct heat losses from the furnace.

RTP systems are becoming increasingly important in the semiconductor industry. The major suppliers of RTP equipment are AG Associates and Applied Materials. A color photograph on the cover page of "Solid State Technology" (April, 1997) illustrates the latest RTP system from AG Associates.

While the industry has largely moved to vertical tube furnaces, horizontal tube furnaces may be making a comeback. The heat shields of the present invention are important with respect to both types as well as the new mini-batch fast-ramp furnaces. The various furnace types and the problems associated with the industry transitions to large 300 mm. (12-inch) wafers are discussed in an article in the March 1997 issue of "Semiconductor International". Page 85 of that article has a schematic drawing similar to FIG. 3 of the present application showing a vertical tube furnace for low-pressure CVD processing that is well suited for use of heat shields in accordance with the present invention.

Embodiments of the invention previously described make it possible to produce quartz glass heat shields with remarkable resistance to transmission of infrared radiation. Modifying the aqueous slurry used for molding or casting the porous silica preform and/or modifying the sintering procedure can produce improved radiation heat shields with a high bubble population density (e.g., substantially above 100 per square millimeter) and/or a relatively low average bubble size (e.g., 10 to 15 microns or less).

In an embodiment of the invention described below, a special new process is utilized to manufacture extremely effective radiation heat shields with a large population of very small gas bubbles. In this embodiment the high-purity aqueous slip or slurry used for casting the porous silica preforms is provided with a unique particle-size distribution that is not obtainable with normal milling methods. The special silica preforms made by this new method can be sintered by a simple, economical, one-stage method to produce opaque quartz glass heat shields or to produce transparent quartz glass products of remarkable quality.

Helium sintering has been employed for to decades in the commercial manufacture of clear full-density quartz glass products from slip-cast silica preforms by a process of the type disclosed in U.S. Pat. No. 4,072,489. The transparent helium-sintered products could be made economically and were widely used in the semiconductor industry; but, prior to the present invention, no practical method was found to eliminate the objectionable visible gas bubbles in the sintered glass, The special silica preforms produced by the new method in accordance with this latest embodiment provide an excellent solution to this long-existing problem.

For more than a decade the high-purity aqueous slurries preferred for use during manufacture of slip-cast quartz glass products (as in U.S. Pat. No. 4,072,489) were produced by ball milling vitreous silica for extended periods, such as 20 hours or more, to reduce the average particle size to the desired range, preferably from 6 to 7 microns. A slurry made in this way would be expected to contain no more than about 15 percent by weight of silica particles with a particle size less than 3 microns and no more than about 10 percent less than 1 micron.

A computerized analysis of a slurry showing the particle distribution can be obtained using a well-known measuring instrument, the Sedigraph 5100. For example, an aqueous slurry prepared in a ball mill in accordance with the standard procedure and suitable for slip casting thin-wall quartz glass receptacles and the like was analyzed on this instrument and reported to have the following particle distribution:

79.7 percent less than 20 microns
72.4 percent less than 25 microns
49.7 percent less than 6 microns
15.6 percent less than 3 microns
10.3 percent less than 1 micron
8.8 percent less than 0.8 micron In carrying out the invention of said last-named embodiment, a first slurry of silica particles prepared in the normal manner by ball milling and having a particle distribution of the type set forth above is admixed with a second high-purity slurry containing finer silica. The admixture is preferably milled for an additional period of time, such as 6 to 12 hours or so, to provide a homogeneous slurry with a unique particle distribution (see Example X).

In the new process, said first slurry is preferably prepared by wet milling silica in a ball mill for 20 to 30 hours or more to provide an average particle size of from 4 to 7 microns or more (preferably from 4.5 to 6 microns). The second slurry preferably contains a high proportion of silica particles with a particle size of from 1 to 3 microns and be prepared in a conventional attritor mill, for example.

An admixture of measured amounts of the two slurries is preferably milled long enough to provided a homogeneous slurry with the desired particle distribution. The milling and dispersion can be effected in a very short period of time in an attritor mill but is preferably carried out in a ball mill or over a longer period, such as 5 to 10 hours. The resulting homogeneous slurry contains silica particles with an average particle size preferably no greater than 5 microns and preferably contains no more than 5 percent with a particle size above 30 microns.

The silica composition of such slurry preferably comprises at least 25 percent (e.g., from 30 to 35 percent) by weight of silica with a particle size greater than 6 microns, from 20 to 30 percent (preferably at least 25 percent) with a particle size of from 3 to 6 microns, from 15 to 30 percent (preferably no more than 25 percent) with a particle size of from 0.8 to 3 microns, and at least about 15 percent (e.g., 15 to 20 percent) with a particle size below 0.8 micron.

A special high-purity aqueous slurry with a particle distribution as indicated in the previous paragraph can be used like a standard slurry for slip casting porous silica preforms. After drying and firing in the usual manner, the preforms can have a relatively low porosity, such as 15 volume percent or less. Such special preforms are particularly well suited for manufacture of high-quality transparent helium-sintered quartz glass products by the process of U.S. Pat. No. 4,072,489 and also has important advantages in the manufacture of nitrided radiation heat shields as described hereinafter.

Such special preforms can be used to form quartz glass that approaches optical grade. For example, a cup-shaped silica preform prepared as described above (or as in Example X) can be sintered in helium alone in a traditional induction furnace as in Example IV and U.S. Pat. No. 4,072,489 to produce clear quartz glass receptacles having good optical quality without the added expense of HIPing. By this traditional procedure, it is possible to produce slip-cast glass receptacles of substantial size (i.e., a width or diameter of at least 20 centimeters) having relatively thin walls (e.g., from 3 to 7 millimeters) formed of optical-grade quartz glass having a total inclusion cross section of 2 to 12 mm$^2$ and a maximum inclusion no greater than 3 mm. Such optical glass produced according to this invention without HIPing preferably has a total inclusion cross section no greater than 10 mm$^2$ and a maximum inclusion of from 0.5 to 2 mm.

Such heat shields can be further improved by employing a mixture of nitrogen and helium gas during sintering of the preform to reduce the size of the gas bubbles in the quartz glass. For example, the nitrogen gas normally used to flush the pores of the silica preform during sintering can be replaced with an inert gas mixture containing at least 25 volume percent of helium and at least 25 volume percent of nitrogen.

The use of a helium-nitrogen mixture during sintering to reduce the size of the nitrogen-filled gas bubbles in the quartz glass heat shields is an important feature of the present invention regardless of the type of preform used. This modified sintering method can be employed with standard slip-cast preforms as well as preforms containing refractory dopants, such as silicon nitride or silicon carbide.

In the normal sintering process as described in this specification and in U.S. Pat. No. 4,072,489, the porous silica preform is supported on a perforated mandrel that is internally pressurized with an inert gas, such as helium, to cause the gas to flow through the preform and flush the pores. During sintering the glass temperature is normally increased to more than 1700° C. When making nitrided, opaque, quartz glass heat shields, the process can be modified by replacing the nitrogen gas with an inert gas mixture containing at least 10 and preferably at least 25 volume percent of nitrogen and at least 25 volume percent of helium (e.g., a 70:30 mixture of nitrogen and helium).

The modified process, using a nitrogen-helium mixture to flush the pores instead of nitrogen gas alone, makes it possible to effect nitridation of the glass and to provide some degree of control over the size of the gas bubbles. The average bubble size can be reduced by increasing the volume percent of helium gas relative to the volume percent of nitrogen gas. If the amount of helium is increased to more than 50 volume percent, it should be possible to reduce the average bubble size at least about 50 percent.

When making quartz heat shields from porous silica preforms of the type described in Example X hereof, the average bubble size can be reduced by flushing the pores of the preform with a helium-nitrogen gas mixture containing at least 50 (e.g., 60 to 70) volume percent of helium gas. If the amount of helium exceeds 60 volume percent, the average bubble size can be reduced to substantially less than 15 microns (e.g., to 10 microns or less).

The average bubble size can be further reduced (e.g., to 5 microns or less) by hot isostatic pressing as in a sinter/HIP furnace. HIPing can also be employed to eliminate the gas bubbles as described hereinafter. It is thus possible to produce nitrided transparent quartz glass with remarkable physical properties.

Although the quality of sintered quartz glass products can be improved substantially by hot isostatic pressing (HIP), the increased cost can be a major drawback, particularly for low volume production. HIPing furnaces can be extremely expensive, particularly when designed for pressures of 1000 atmospheres or more. For this reason it may be preferable to employ a sinter/HIP furnace designed to operate at lower pressures below 500 atmospheres (e.g., at a maximum pressure of 100 to 300 atmospheres).

In the practice of the present invention HIPing is carried out by the sinter plus HIP method in separate furnaces or by the sinter/HIP method in a single furnace. Gas pressure sintering (GPS) is similar to sinter/HIP. A sintered opaque quartz glass article made by the process of this invention can, for example, be heated to a temperature of from 1200° C. to 1300° C. in a HIPing furnace and converted to transparent glass under a pressure of from 1000 to 2000 atmospheres. A nitrided glass can be HIPed in this way to produce clear nitrided glass of optical grade having outstanding physical properties.

Nitrided transparent quartz glass can also be prepared in a sinter/HIP furnace. If the HIPing is carried out while the glass is at a very high temperature (e.g., above 1600° C.), a pressure of 300 atmospheres or less may be adequate to obtain the desired degree of clarity.

Various sinter/HIP furnaces are available commercially that can readily be adapted for use in the practice of the present invention. Another option is to modify a traditional induction furnace by adding a separate heated furnace chamber to effect HIPing. The mandrel on which a silica preform is sintered could be transferred directly from the furnace chamber to the separate pressure chamber before the glass article is cooled substantially.

When HIPing is employed to reduce or control the bubble size or to eliminate bubbles in a sintered quartz glass article made according to this invention, the preferred procedure is to sinter the porous silica preform in an inert gas, such as helium, nitrogen or argon, at atmospheric or subatmospheric pressure and a high temperature usually above 1600° C. until the pores close and thereafter apply a very high pressure to the glass while it is still hot for a limited period of time sufficient to allow the bubbles to shrink in size or collapse. The glass is preferably heated to about 1750° C. to eliminate cristobalite and may be HIPed while at a temperature from 1600° C. to 1750° C. before or after the glass reaches its maximum temperature.

The glass may be allowed to cool from 1750° C. to less than 1400° C. before HIPing is initiated and then subjected to a high pressure, such as 500 to 2000 atmospheres, if the needed equipment is available. HIPing at a temperature of from 1200° C. to 1300° C. for a limited period of time, such as 10 to 20 minutes, can be effective at a pressure of 1000 atmospheres to produce clear glass, for example. However, less pressure and less expensive equipment is required if HIPing is carried out at a temperature, such as 1600° C. to 1750° C.

When making white opaque quartz glass heat shields (e.g., see Example II) the average bubble size can be reduced or controlled in a sinter/HIP furnace to improve the product and greatly increase its resistance to transmission of infrared radiation. Excellent results can sometimes be achieved using less expensive sinter/HIP furnaces designed to operate at pressures of 100 atmospheres or less, such as AVS Model SH-4 described previously.

Less pressure is required to achieve the desired result when HIPing can be carried out at a temperature above 1600° C. where the glass flows readily. Another advantage of high-temperature HIPing is the ability to eliminate cristobalite (e.g., at 1750° C.). One preferred method for HIPing sintered quartz heat shields is to sinter a porous silica preform on a mandrel (as in Example I) to a temperature of 1700° C. or higher before initiating HIPing and applying high pressure to the glass for a predetermined period of time adequate to effect the desired reduction in the average bubble size while the glass remains at a temperature near or above 1700° C. The glass can be heated to 1750° C. before or during HIPing to eliminate cristobalite.

Hipping in the manner described above makes it possible to produce remarkably effective radiation heat shields with a bubble population density of 100 to 120 mm² or higher and an average bubble size, such as 3 to 6 microns.

The pressure required for HIPing an opaque quartz glass depends on the glass temperature and the degree of compression sought and sometimes could be relatively low (e.g., 20 to 40 atmospheres or less).

In another embodiment of the present invention, the refractory silica composition used to make the silica preform is modified by adding a small amount of particulate combustible organic binder or filler, usually no more than a few percent by weight. The organic material used for this purpose is preferably relatively pure and of a non-contaminating type that oxidizes completely during firing of the preform without leaving a significant residue (e.g., see Example VIII).

A substantial number of organic binders or fillers that have been used or have been proposed for use in particulate refractory compositions are suitable for use in the process of the present invention. These include carbohydrates, such as starch, microcrystalline cellulose and the like; organic polymeric compounds, such as polystyrene, vinyl resins and other synthetic polymers; and other compatible combustible carbon compounds. The organic binders or fillers used in the practice of this invention may be commonly used commercial products, such as microcrystalline cellulose, and may, for example, be available in dry particulate form with an average particle size of from 10 to 100 microns.

In preparing an aqueous slurry for casting of a silica preform in accordance with this embodiment of the invention, a refractory silica composition consisting essentially of high-purity silica is thoroughly mixed with from 0.3 to 5 percent by weight (preferably 0.4 to 4 percent by weight) of a suitable compatible organic binder or filler. The mixture can be milled to reduce the particle size and to provide a homogeneous aqueous slurry suitable for slip casting. A slip-cast silica preform made from this slurry can have a high porosity when the amount of the organic binder or filler is substantial (e.g., at least 2 percent by weight). The amount used is usually no more than about 3 percent but could be substantially greater when making special quartz glass products having a low bulk density (e.g., below 70 percent).

In this embodiment of the invention a porous high-purity silica preform prepared in the manner described above can be nitrided and sintered in nitrogen in the manner described in Example VIII or in the manner previously described in connection with conventional preforms. The resulting opaque quartz glass product can be provided with a high bubble population density (e.g., greater than 120 per square millimeter) and exceptional resistance to transmission of infrared radiation. The quartz glass may be produced with a density in the range of 90 to 95 percent by weight or with a relatively low density (e.g., 60 to 85 percent or lower).

The organic binder or filler preferred for use in the embodiment described above is insoluble in water and has a high purity. Excellent results can be obtained when using AVICEL PH, a microcrystalline cellulose (MCC) made by FMC Corporation and designed primarily for use as a binder in pharmaceutical products. Such binder is a purified partially-depolymerized alpha cellulose derived from wood pulp and sold as a free-flowing powder virtually free of organic and inorganic contaminants.

AVICEL PH (MCC) is insoluble in water, in dilute acids and in most organic solvents and is available commercially in various grades with typical average particle sizes of 20, 50, 90 and 180 microns. The bulk density ranges from 0.25 to 0.4 grams per cubic centimeter.

A cogent basis for comparison can be provided by slip casting two identical silica preforms from the same slurry (e.g., the slurry of Example I or the same slurry with a higher calcium content). One porous preform is dried, fired in air for about 3 hours at 1150° C. to oxidize the combustibles, and then sintered in helium in a semi-automatic induction furnace as described in U.S. Pat. No. 4,072,489 and said Example I. If the other identical preform is dried and fired in essentially the same way and then sintered in nitrogen to almost full density in the same induction furnace in essentially the same way, the improvement in the physical properties can be almost unbelievable. The improvement can be even more dramatic if the slurry contains suitable amounts of silicon nitride particles.

While good results can be obtained by sintering in two stages or by using two or more furnaces as disclosed in U.S. patent applications Ser. Nos. 08/269,002 and 08/804,234 U.S. Pat. No. 6,012,304 it may be more practical to employ a single electric induction furnace of the type disclosed in U.S. Pat. No. 4,072,489 in which nitriding is effected in a nitrogen atmosphere or optionally in a reducing atmosphere consisting of nitrogen gas and a reducing gas, such as hydrogen, methane or carbon monoxide. The sintering operation can be carried out at a relatively high temperature, such as 1400° C. to 1600° C. or higher, in a short period of time, such as 10 to 20 or perhaps 30 minutes. After nitriding the sintered preform may be further heated to a temperature above 1700° C. to increase the density and/or to eliminate cristobalite.

While the porous preform is nitrided and sintered in the induction furnace at a temperature above 1400° C., it is preferable to cause pressurized nitrogen gas to flow through the preform as by use of a perforated or porous graphite support, such as the graphite mandrel (16) described hereinafter in Example I. The porous graphite support used during sintering of a glass crucible could, of course, be concave or convex.

When making simple articles, such as quartz glass receptacles, slip casting is usually employed to form the porous preform prior to nitriding. When conventional plaster of Paris molds are used for slip casting, the calcium ions introduced into the preform serve like a catalyst and promote nitriding. It will be understood, however, that the presence of calcium ions or alkaline earth metal ions is not essential and that the preform need not be formed by slip casting.

The methods and procedures described and the unique refractory compositions advocated in the examples of this specification or set forth as preferred embodiments are merely illustrative and are not intended to limit the scope of the invention. They are practicable and should be appropriate and useful in attaining the major or important advantages of the invention.

EXAMPLE I

A high-purity fused quartz slurry is prepared by wet milling high-purity fused quartz (99.99% $SiO_2$) using ultra-pure deionized water and a high-purity fused quartz grinding media in a conventional ball mill. The silica particles are milled for about 24 to 36 hours to provide a slip or slurry with a pH of from 2 to 4, an average particle size of from about 5 to about 7 microns, and a solids content of from about 82 to 84 percent by weight. The pH of the slurry is adjusted to about 7.5 by adding some dilute ammonium hydroxide. The slurry can be mixed or stirred for an extended period prior to being used.

In the making of a quartz glass receptacle in accordance with this invention, the above slurry can be employed for slip casting a cup-shaped silica body or preform in a conventional plaster of Paris mold using conventional drain-casting procedures similar to those described in U.S. Pat. Nos. 3,972,704 and 4,072,489. The slip-cast preform is air dried for about 24 hours in a warm drying room maintained at a temperature somewhat above 40° C. and then placed in an electric furnace and gradually heated to about 800° C. in an atmosphere of air and superheated steam. The preform is maintained at about 800° C. in such atmosphere for about 2 hours and then heated to about 1200° C. in such atmosphere for an additional 2 hours to assure complete oxidation of the hydrocarbons or combustibles. The amount of vaporized water or steam is adequate to provide the desired vapor pressure and to maintain the desired hydroxyl content in the preform.

After such firing the preform has a porosity of from 15 to 20 volume percent and should have adequate strength for handling. Except for a high hydroxyl content, the porous silica preform is conventional. The wall thickness is substantially uniform and may be from 5 to 7 millimeters, for example, in a cup-shaped receptacle with a diameter of 25 to 30 centimeters.

Thereafter, the porous silica preform is mounted upside-down on the heated hollow graphite mandrel (16) of a semi-automatic electric induction furnace of the type disclosed in said U.S. Pat. No. 4,072,489. The preform is shaped to fit the mandrel. The sintering procedure may be similar to that disclosed in that patent, but the glass is sintered in a nitrogen atmosphere rather than in helium. The mandrel is perforated and internally pressurized with nitrogen to cause the nitrogen to flow radially outwardly through the mandrel and the porous preform. Just before the preform enters the furnace chamber, the temperature of the mandrel and the furnace may be around 1300° C. to 1500° C. The mandrel and the porous preform are advanced into the furnace chamber to start the sintering cycle, and the furnace is heated at a rapid rate to increase the glass temperature from below 1400° C. to above 1600° C. and gradually to more than 1700° C. to cause the silica particles to coalesce and the glass to reach a high density.

The glass is preferably heated to about 1750° C. to assure that no cristobalite remains in the glass. When the glass reaches that temperature, as indicated by a pyrometer, the mandrel and the sintered receptacle are retracted out of the furnace and cooled to permit removal of the receptacle. The total time for the sintering operation in the induction furnace can be relatively short and depends on the thickness of the glass and also the initial temperature of the mandrel. It may take from 8 to 12 minutes to provide the desired sintering. A non-oxidizing atmosphere of nitrogen gas is provided in the induction furnace during the sintering operation.

Sintering of the glass in nitrogen as described above produces a white, opaque quartz glass. The sintered quartz glass receptacle can have a density in excess of 98.5 percent by weight and pores of minute size.

The quartz glass receptacle produced by the procedure of this Example I has remarkable properties which one would not expect in view of the small amount of chemically-combined nitrogen actually present in the glass structure. The nitriding of the quartz glass effects a great increase in the viscosity of the glass at high temperatures above 1400° C. and an incredible increase in the resistance of the glass to devitrification.

EXAMPLE II

A high- purity slurry prepared according to Example I is employed for slip casting of a cup-shaped silica body or preform as described in that example but the preform is not hydroxylated in superheated steam. Instead it is fired in the normal manner an maintained at a temperature of about 1120° C. about 3 hours. The fired preform is essentially the same as that of Example I and has a substantial calcium content but a lower hydroxyl content.

The fired preform is thereafter mounted on the graphite mandrel (16) and sintered in the manner described in Example I to a temperature above 1750° C. to produce a white opaque quartz glass product with physical properties comparable to those obtained by the procedure followed in that example.

EXAMPLE III

A high-purity fused quartz slurry is prepared in the same way as described in Example I but 0.1 percent by weight of silicon nitride is added to the ball mill and the milling time is increased to 40 hours to assure thorough mixing and to break up agglomerates.

The silicon nitride added to the mill has an average particle size of about 0.5 micron and can be made by nitriding micronized particles of elemental silicon in known manner.

A cup-shaped silica body or preform is formed by slip casting,dried and fired in the same way as described in Example II. Thereafter the fired preform is mounted on the mandrel (16) and sintered in essentially the same way as in Example I but helium gas, rather than nitrogen gas, is caused to flow through and fill the pores of the preform during sintering. Again the glass was heated to a temperature in excess of 1750° C. Again the process produces an opaque nitrided quartz glass product with exceptional physical properties.

EXAMPLE IV

It may be advantageous to fill the pores of the preform with a silica gel prior to firing. The preferred procedure is to impregnate the entire silica preform with a tetraethyl orthosilicate (TEOS) which has been hydrolyzed with a suitable acid or base. Such hydrolyzed TEOS can be produced from a mixture of TEOS (i.e., SILBOND PURE) with water and a small amount of hydrochloric acid as disclosed, for example in U.S. Pat. No. 4,789,389. The mole ratio of water to TEOS can be from 6:1 to 10:1.

In this Example IV a porous silica preform identical to the preform of Example II is slip cast and dried for 24 hours at a temperature of about 43° C. and then soaked and completely impregnated with the hydrolyzed TEOS. After draining and removing the TEOS from the preform, the preform is placed in a closed container with ammonium hydroxide for 15 minutes or more to gel the TEOS which substantially fills the pores of the preform. Thereafter, the preform is dried for about 24 hours in air at about 43° C. and then fired in air in an electric furnace for about 3 hours at about 1100° C. to oxidize the combustibles.

The resulting porous silica preform with a density of about 88 percent can then be removed from the furnace, placed on the hot porous mandrel (16) of the semi-automatic induction furnace and sintered in nitrogen or helium in the manner described in Example I to a temperature of 1750° C.

The sintering can be carried out in a helium atmosphere (or in a vacuum) according to said U.S. Pat. No. 4,072,489 to produce a full density transparent quartz glass receptacle.

The sintering can also be carried out in nitrogen or in a nitrogen-helium mixture to produce a white, opaque quartz glass comparable to that of Example I.

EXAMPLE V

A high-purity fused quartz slurry is prepared from high-purity fused quartz (e.g.,99.99% $SiO_2$) and 0.01 percent by weight of silicon nitride particles with a purity of at least 99.9 percent and an average particle size of 0.4 to 0.5 microns. These refractory materials are wet milled in a conventional ball mill using deionized water as described in the previous examples for 40 hours or so to provide a slurry with a pH of about 3, an average particle size of from about 5 to about 7 microns and a solids content of from about 82 to 84 percent by weight. The solid material consists essentially of about 0.01 percent by weight of silicon nitride and about 99.99 percent by weight of vitreous silica.

The pH of the slurry is adjusted to about 7.5 by adding dilute ammonium hydroxide, and the slurry is stirred or mixed for 8 hours or more prior to use.

The above slurry is employed with a conventional plaster of Paris mold to slip cast a cup-shaped silica body or preform as in the previous examples. The slip-cast preform is air dried for at least 20 hours at about 40° C. and then placed in an electric furnace and gradually heated to a temperature above 1100° C. It is maintained at a temperature of about 1120° C. for about 3 hours and then cooled to room temperature.

After firing the preform has a porosity of about 17 to 18 volume percent and adequate strength for handling. It may, for example, have a diameter of from 25 to 30 centimeters and a wall thickness of from 5 to 7 millimeters.

Thereafter the porous silica preform is mounted upside-down on a heated mandrel (16) as described in the previous examples. The mandrel is perforated and internally pressurized with helium gas which flows through the porous preform to flush out other gases as the preform is heated to 1400° C. and above. The sintering cycle is substantially as described in the previous examples and the silica particles coalesce as the temperature is raised to 1700° C. and above.

The glass is preferably heated to a temperature somewhat above 1750° C., as indicated by a pyrometer, and the mandrel (16) and the sintered quartz glass receptacle is retracted out of the furnace chamber and cooled to permit removal of the receptacle from the hot mandrel. The total time for sintering can be 10 minutes or so.

Sintering of the glass in helium in the manner described above produces an opaque nitrided quartz glass with a cellular structure and a density of about 98 percent by weight, which appears to be somewhat less than that obtained by the procedure of Example II.

EXAMPLE VI

A cup-shaped silica preform is prepared from the slurry of Example V by slip casting as described in that example and is then fired for 3 hours at 1120° C. to produce a porous silica preform identical to that of Example V which contains about 0.01 percent by weight of silicon nitride. The preform is then mounted on the perforated mandrel (16) and sintered in nitrogen in the manner described in Example I to temperature of at least 1750° C. to produce a white, opaque quartz glass receptacle with a density substantially less than that obtained in Example V and outstanding physical properties as described in Example I. The silicon nitride produced a great increase in the concentration of bubbles in the glass and the resistance of the glass to transmission of infra-red radiation.

EXAMPLE VII

An opaque high-purity quartz glass receptacle is prepared using exactly the same procedure as described in Example VI with one exception. The amount of silicon nitride is increased to about 0.4 to 0.6 percent by weight. As a result the resulting product has a much lower density and a higher bubble content. By increasing the number of silicon nitride particles, it is possible to produce low-density glass with exceptional physical properties.

EXAMPLE VIII

A high-purity fused silica slurry is prepared in substantially the same way as described in Example I except that one percent by weight of high-purity microcrystalline cellulose (AVICEL) with an average particle size of about 20 to 25 microns is added to the mill after the fused silica had been milled for about 12 hours. The milling is continued for about 16 hours with addition of small amounts of water as needed. The pH of the slurry is then adjusted to about 7.5 by adding dilute ammonium hydroxide.

A cup-shaped silica body or preform is formed by slip casting, dried and fired in the same way as described in Example IV. After firing the silica preform has a relatively high porosity and a high purity of at least 99.99 percent. The preform may, for example, be a receptacle of substantial size as in Example V with a greater wall thickness.

The porous preform is thereafter mounted on the mandrel (16) and sintered in nitrogen in the same way as described in Example I to a temperature above 1750° C. The resulting high-purity quartz glass product is opaque, has a density of about 93 to 94 percent by weight, and has a relatively high bubble content. It is particularly well suited for use as a radiation heat shield.

If the amount of AVICEL in this Example VIII is increased from one percent to two percent or more in the slurry described above,the silica preform can have a porosity greater than 35 volume percent and the final sintered quartz glass product can have a lower density, such as 85 percent or substantially less depending on the particle size of the microcrystalline cellulose (or other suitable organic compound) that is selected.

EXAMPLE IX

Standard profile tables generated as a result of autoprofiling during operation of an oxidation furnace provide a simple and convenient way to rate furnace performance.

Data was collected to evaluate the performance of an SVG Thermco VTR 7000 oxidation furnace of the type previously described in connection with FIGS. 3 and 4 of the drawings having an opaque nitrided high-purity quartz end cap (3a) welded to the top of the clear quartz process tube (19). The furnace has only 3 control zones as in FIG. 4 but is otherwise comparable to the furnace shown in FIG. 3.

The opaque quartz end cap is made in accordance with the present invention and can be produced substantially in the manner indicated in Example II using the slurry of Example I for slip casting a shaped vitreous silica preform substantially in the manner described in Example I. After drying and firing to remove combustibles, the porous silica preform is sintered in nitrogen under non-oxidizing conditions substantially as described in Example I to produce an opaque high-purity quartz glass end cap (i.e., the cap 3 or 3a) with a density of at least 98.5 percent by weight. The quartz end cap contains on average about 50 gas bubbles with an average bubble size of from about 18 to 20 microns in each square millimeter. A dense quartz glass of this type with a bubble concentration of $50/mm^2$ has excellent resistance to transmission of infrared radiation.

Profiling Tables 1 and 2 contain test data for the 3-zone Thermco VTR 7000 reactor with an opaque nitrided quartz glass end cap (3a) as described above. The last vertical column at the right, which indicates total output, is not part of a normal profile table. This column was added to indicate the total output power required for each profile temperature.

The first "slot" column indicates the four stages during a furnace run. The profile and spike thermocouple readings for each of the three control zones in the furnace are set forth in degrees Centigrade (° C.). The vertical "output" column for each of the three control zones sets forth a unit-less value generated by the furnace's proportional band controller to indicate the heating element power consumption. The last vertical column at the right indicates total output—the total power consumption of the bottom, center and top heating elements (FIG. 4).

The test data from Tables 1 and 2 can be compared to similar data obtained when the opaque glass end cap is replaced with an end cap formed of clear quartz glass. In this Example IX, the opaque glass end cap 3a of the VTR 7000 furnace described above is replaced by a glass end cap 3a of the same size and shape welded to tube 19 and formed of a transparent high-purity quartz glass identical to that of the tube 19.

Profiling Table 3 sets forth the test data for the 3-zone VTR 7000 reactor provided with the transparent end cap (3a). The total power outputs for slots 1, 2 and 3 set forth in Tables 1 and 2 were about 7 to about 9 percent less than those set forth in Table 3. This data confirms the fact that opaque nitrided quartz end caps can provide a remarkable reduction in heat loss by radiation even when the glass has a relatively high density.

Sematech VTR 7000 Profiling Table 1

| | LOAD/BOTTOM | | | CENTER (4 OX10LITER) | | | SOURCE/TOP | | | OUTPUT |
|---|---|---|---|---|---|---|---|---|---|---|
| SLOT | Prof. | Spike | Output | Prof. | Spike | Output | Prof. | Spike | Output | TOTAL |
| 1 | 0700 | 0671.4 | 0504 | 0700 | 0646.7 | 0228 | 0700 | 0635.5 | 0378 | 1110 |
| 2 | 0798 | 0774.2 | 0690 | 0600 | 0753.5 | 0294 | 0800 | 0741.3 | 0495 | 1479 |
| 3 | 0895 | 0878.8 | 0909 | 0900 | 0859.5 | 0363 | 0901 | 0850.8 | 0630 | 1902 |
| 4 | 0996 | 0981.6 | 1251 | 0998 | 0961.8 | 0462 | 1000 | 0957.4 | 0837 | 2550 |

Sematech VTR 7000 Profiling Table 1

| | LOAD/BOTTOM | | | CENTER (4 OX10LITER) | | | SOURCE/TOP | | | OUTPUT |
|---|---|---|---|---|---|---|---|---|---|---|
| SLOT | Prof. | Spike | Output | Prof. | Spike | Output | Prof. | Spike | Output | TOTAL |
| 1 | 0700 | 0734.9 | 0504 | 0700 | 0649.7 | 0225 | 0700 | 0630.0 | 0369 | 1098 |
| 2 | 0798 | 0776.9 | 0684 | 0600 | 0754.9 | 0297 | 0800 | 0742.2 | 0480 | 1461 |
| 3 | 0896 | 0879.7 | 0921 | 0900 | 0860.4 | 0378 | 0901 | 0851.4 | 0633 | 1932 |
| 4 | 0996 | 0983.5 | 1248 | 0998 | 0982.5 | 0465 | 1000 | 0958.1 | 0831 | 2544 |

Sematech VTR 7000 Profiling Table 1

| | LOAD/BOTTOM | | | CENTER (4 OX10LITER) | | | SOURCE/TOP | | | OUTPUT |
|---|---|---|---|---|---|---|---|---|---|---|
| SLOT | Prof. | Spike | Output | Prof. | Spike | Output | Prof. | Spike | Output | TOTAL |
| 1 | 0700 | 0644.8 | 0678 | 0700 | 0838.5 | 0213 | 0700 | 0645.8 | 0321 | 1212 |
| 2 | 0798 | 0746.6 | 0864 | 0600 | 0742.7 | 0294 | 0800 | 0749.8 | 0417 | 1575 |
| 3 | 0896 | 0850.4 | 1158 | 0900 | 0818.0 | 0351 | 0901 | 0856.5 | 0510 | 2079 |
| 4 | 0998 | 0980.0 | 1545 | 0998 | 0960.0 | 0450 | 1000 | 0959.8 | 0711 | 2706 |

EXAMPLE X

A fused quartz slurry is prepared by wet milling high-purity fused quartz for 24 to 30 hours or more using deionized water in a ball mill generally in the manner described in Example I. After such milling the resulting silica composition in the slurry has an average particle size of from about 4.5 to about 5.5 microns and contains less than 9 percent by weight of silica with a particle size of from one micron to 3 microns.

The slurry is then admixed with a second high-purity fused quartz slurry containing finely ground silica from an attritor mill. The admixture is milled for an additional 8 to 10 hours to provide a homogeneous slurry of silica particles with an average particle size below 5 microns in which 15 to 20 percent by weight of the silica has a particle size of from 15 to 25 microns, 20 to 23 percent has a particle size of from 6 to 15 microns, 28 to 30 percent has a particle size of from 3 to 6 microns, 16 to 18 percent has a particle size of from 0.8 to 3 microns, and 12 to 15 percent by weight has a particle size less than 0.8 microns.* The slurry can have a measured solids content of 60 to 70 percent or more and a pH below 4, which is adjusted to about 7.5 as in Example I.

After further mixing, the slurry is then employed for slip-casting of a cup-shaped silica body or preform in a plaster mold in the manner described in Example I. The porous silica preform is thereafter dried and fired for about 3 hours at 1120° C. as described in Example II. The fired preform is then mounted on the perforated graphite mandrel (16) which is internally pressurized with an inert gas (mixture), and sintered to a temperature of about 1750° C. in a manner substantially as described in Example I (except that the nitrogen gas used to flush the pores of the preform during the sintering is replaced by an inert gas mixture of 30 to 35 volume percent helium and 65 to 70 volume percent nitrogen).

\* The distribution as determined by a Sedigraph 5100.

Sintering of the glass using the inert gas mixture as described above produces a white, opaque nitrided quartz glass of high density generally comparable to that of Example I and II having nitrogen-containing pores and exceptional resistance to devitrification. The helium does not prevent effective nitridation of the glass and greatly reduces the size of the gas bubbles therein. The opaque quartz glass cup or receptacle produced according to this Example X has greater resistance to transmission of infrared radiation than the similar quartz glass article of Example I or Example II.

The process described in Example X and a special slurry corresponding to or similar to that described in that Example can be used to produce transparent helium-sintered quartz glass of substantially improved quality. Transparent glass manufactured in this way by sintering in 100% helium, rather than in a nitrogen-containing gas mixture, can be far superior to the standard helium-sintered quartz glass because the present invention makes it possible to eliminate most or a vast majority of the objectionable visible gas bubbles in the glass.

The process described in Example X can be modified in various ways to produce opaque quartz heat shields with outstanding resistance to transmission of infrared radiation. If, for example, the inert gas mixture of that Example is replaced with a mixture of 80 to 90 volume percent helium and 10 to 20 volume percent nitrogen, the bubble size can be further reduced, thereby greatly increasing the effectiveness of the glass as a radiation heat shield. The effectiveness can also be increased by modifying the particle size distribution to obtain more uniformity and less variation in the sizes of the gas bubbles.

It will be understood that more effective heat shields can also be produced by adding minute amounts of refractory dopants to the refractory silica composition employed in Example X. For example, such silica composition could contain a very small amount (e.g., 0.005 to 0.01 percent by weight) of submicron or colloidal particles of a refractory dopant, such as silicon carbide or silicon nitride.

Opaque quartz glass heat shields made according to the present invention can have a highly desirable bubble structure that is extremely effective in resisting transmission of infrared radiation. The effectiveness of the glass as a radiation heat shield can be substantially improved by increasing the number of gas bubbles with a relatively small size (e.g., from 4 to 10 microns).

The opaque quartz articles produced according to Example I and II can be HIPed to produce transparent nitrided quartz glass with a clarity near or equal to that of optical-grade glass. For example, the white quartz glass receptacle of Example I or Example II can be placed in a HIPing furnace, heated to a temperature of from 1220° C. to 1250° C., and maintained at that temperature for 15 minutes or more while being subjected to a pressure of about 1000 atmospheres to eliminate the gas bubbles and provide a transparent nitrided quartz glass with good optical quality.

It will be understood that the above description is by way of illustration rather than limitation and that variations and modifications of the specific compositions, processes and products disclosed herein may be made without departing from the spirit of the invention.

What is claimed is:

1. A process for making a shaped quartz glass article with improved physical properties comprising preparing a slurry containing a refractory composition consisting essentially of silica particles with an average particle size of from about 2 to 10 microns and from about 0.01 to about 2 percent by weight of micronized particles of a compatible refractory dopant, said dopant comprising a metal nitride or a carbide of silicon which releases a gas when said refractory composition is heated to a sintering temperature above 1400° C., casting a porous silica body in a shaped mold containing said slurry, firing said silica body to eliminate combustibles and provide a silica preform with a porosity of from about 10 to about 35 percent by volume having internal pore surfaces, and thereafter heating said preform to a temperature of from about 1400° C. to about 1750° C. under non-oxidizing conditions to coalesce the silica particles and to cause release of gas from said refractory dopant and formation of a multitude of bubbles of trapped gas in the quartz glass article.

2. A process according to claim 1 wherein said refractory composition contains from about 0.01 to about 0.5 percent by weight of silicon carbide particles.

3. A process according to claim 1 wherein said refractory composition contains from about 0.01 to about 0.5 percent by weight of refractory metal nitride particles that release nitrogen after said preform is heated to a sintering temperature.

4. A process according to claim 1 wherein said refractory composition contains at least about 0.01 percent by weight of silicon nitride particles.

5. A process according to claim 1 wherein said refractory composition contains from about 0.01 to about 0.2 percent by weight of a compatible refractory dopant comprising a metal nitride that decomposes at a temperature of from about 1450° C. to about 1750° C. to release nitrogen for reaction with the silica.

6. A process for making quartz glassware with improved high-temperature viscosity and high resistance to devitrification comprising forming a porous silica body by shaping a refractory composition consisting essentially of micronized silica particles and from about 0.01 to about 0.3 percent by weight of evenly distributed micronized particles of a refractory dopant comprising a metal nitride which releases nitrogen gas during sintering at a temperature above 1400° C., firing said silica body to eliminate combustibles and provide a porous silica preform, and thereafter heating said preform in a furnace under non-oxidizing conditions to cause the silica to coalesce and react with nitrogen released by said dopant.

7. A process according to claim 6 wherein said dopant is a nitride of silicon and said preform is sintered in an inert gas mixture containing at least 10 volume percent of nitrogen and at least 30 volume percent of helium.

8. A process according to claim 1 wherein the silica particles of said refractory composition have an average particle size of from about 2 to about 4 microns and said refractory dopant has an average particle size of less than one micron.

9. A process according to claim 6 wherein said refractory composition contains silica particles with an average particle size of from 2 to 10 microns and silicon nitride particles with an average particle size below 2 microns.

10. In a process for making a quartz glass article with improved high-temperature viscosity and high resistance to devitrification from a fired preform, said preform comprising a porous silica body made by shaping a refractory composition consisting essentially of fine particles of high-purity silica and firing said body at a temperature of at least 1000° C., said process comprising heating the fired preform to a sintering temperature above 1600° C. to coalesce the silica particles, the improvement wherein the preform contains from about 0.01 to about 0.2 percent by weight of evenly distributed micronized particles of silicon nitride or silicon oxynitride.

11. A process according to claim 6 wherein said silica particles have a purity of at least 99.95 percent and an average particle size of from 2 to 10 micron, the dopant particles have an average particle size below 2 microns, and the fired silica preform is sintered at a temperature of at least 1700° C.

12. A process for making a shaped silica body comprising preparing a slurry containing a refractory composition consisting essentially of silica particles with an average particle size of from 2 to 10 microns and from about 0.01 to about 0.2 percent by weight of evenly distributed micronized particles of a refractory silicon-nitrogen compound that releases nitrogen at a sintering temperature above 1400° C., casting said silica body in a shaped mold containing said slurry, and drying and firing said body to remove combustibles and produce a shaped porous silica article.

13. A process according to claim 12 wherein said silica particles have a purity of at least 99.95 percent, said micronized particles are formed of silicon nitride and have an average particle size no greater than 1 micron, and said silica body is formed by slip casting.

14. A process according to claim 12 wherein the fired porous silica body is placed in a furnace and heated to a sintering temperature above 1400° C. to cause decomposition of said silicon-nitrogen compound, to release nitrogen from said compound, and to cause said silica particles to coalesce.

15. A process according to claim 14 wherein said silica particles have a purity of at least 99.95 percent, said slurry contains from about 0.01 to about 0.2 percent by weight of evenly distributed silicon nitride particles, and said silica body is heated to a temperature above 1500° C. to effect nitridation and to produce an opaque quartz glass article having a nitrogen content of at least 25 ppm.

16. A shaped slip-cast silica article made from a slurry by the process of claim 12 having a porosity of from about 10 to about 35 volume percent and a purity in excess of 99.99 percent by weight, said slurry containing at least 0.01 percent by weight of evenly distributed silicon nitride particles.

17. A process for making quartz glass products comprising preparing a slurry containing a first refractory composition consisting essentially of micronized particles of silica, milling said composition to provide the silica with an average particle size greater than 4 microns, modifying the slurry by adding more finely ground silica, milling the resulting admixture to provide a substantially homogeneous slurry of silica particles wherein the resulting mixed refractory silica composition comprises at least about 25 percent by weight of silica with a particle size greater than 6 microns, from about 20 to about 30 percent with a particle size of from 3 to 6 microns, from about 15 to about 30 percent with a particle size of from 0.8 to 3 microns, and at least about 15 percent with a particle size below 0.8 micron, casting a shaped porous silica preform from said slurry, drying and firing said preform to oxidize combustibles and to provide a shaped silica body with a porosity of at least 10 volume percent, and sintering said silica body to a temperature above 1700° C. to form quartz glass, said body being flushed with an inert gas during sintering to avoid oxidation, said gas comprising at least about 25 volume percent of helium gas.

18. A process according to claim 17 wherein said resulting silica composition has an average particle size below 5 microns and contains from about 25 to about 30 percent by weight of silica with a particle size of from 3 to 6 microns and from about 15 to about 25 percent by weight with a particle size of from 0.8 to 3 microns, and wherein said gas is a mixture containing at least about 25 volume percent of nitrogen gas.

19. A process according to claim 18 wherein said first refractory composition contains less than 10 percent by weight of silica with a particle size of from about one to 3 microns, and wherein said body is sintered while being flushed with an inert gas mixture containing an amount of helium no less than about 60 volume percent.

20. A process according to claim 17 wherein the porous fired preform is impregnated with a hydrolyzed silicon alkoxide which is gelled, dried and fired to reduce the porosity of the preform before it is sintered.

21. A process according to claim 6 for making dense quartz glass products wherein the sintered preform is heated to a temperature above 1700° C., and the resulting quartz glass is subjected to a pressure of at least about 40 atmospheres for at least about 10 minutes while at a temperature above 1400° C.

22. A transparent quartz glass article formed by sintering and fusing a porous slip-cast silica preform in helium in a traditional semiautomatic induction furnace without isostatic pressing, said preform having a maximum porosity in the neighborhood of 15 volume percent, said article comprising optical-grade quartz glass having a maximum inclusion of no more than 3 millimeters and a total inclusion cross section of from 2 to 12 square millimeters at the conclusion of the helium sinter.

23. A body of nitrided opaque quartz glass with improved high-temperature viscosity and high resistance to devitrification having a density of at least 90 percent by weight and a purity of at least 99.95 percent, said glass being formed by sintering a porous preform to a temperature above 1700° C. to remove cristobalite, having a multitude of evenly distributed nitrogen-containing gas bubbles of microscopic size that blocks transfer of infrared radiation, having a bubble population density of at least 80 per square millimeter, and containing chemically-bound nitrogen in an amount of at least 25 ppm.

24. A glass body according to claim 23 having a nitrogen content of at least 40 ppm, a density less than 97 percent and a multiplicity of nitrogen-containing bubbles with an average width no greater than about 20 microns.

25. A body of quartz glass according to claim 23 having a density of at least 95 percent by weight, a viscosity at 1260° C. of at least $10^{11}$ poises, a nitrogen content of at least 50 ppm, a bubble population density of at least about 120 per square millimeter, and an average bubble diameter no greater than about 10 microns.

26. A transparent glass body formed from a nitrided opaque quartz glass as defined in claim 23, said glass body having a viscosity of at least $10^{11}$ poises at 1260° C., said opaque glass being densified by hot isostatic pressing to remove gas bubbles and improve optical quality.

27. A process for making a shaped opaque quartz glass article comprising preparing a homogeneous aqueous slurry containing a refractory composition consisting essentially of micronized silica particles with an average particle size of from 2 to 10 microns and from about 0.4 to about 4 percent by weight of a compatible water-insoluble organic filler having an average particle size of from 10 to 100 microns, casting a porous silica body in a shaped mold containing said slurry, firing said silica body to oxidize said organic filler and other combustibles and provide a silica preform with a porosity of at least 25 percent by volume, and thereafter heating said preform to a temperature above 1600° C. in a furnace in the presence of an inert gas to coalesce the silica particles and form a quartz glass containing a multitude of evenly distributed gas bubbles of microscopic size that blocks transfer of infrared radiation.

28. In a process for making a nitrided quartz glass article with improved high-temperature viscosity and high resistance to devitrification comprising preparing a slurry containing a refractory composition consisting essentially of silica particles with an average particle size of from 1 to 10 microns, casting a porous silica body in a shaped mold containing said slurry, firing said silica body to eliminate combustibles and provide a silica preform with a porosity of from about 10 to about 35 percent by volume, and thereafter heating said preform to a sintering temperature of from about 1400° C. to about 1750° C. under non-oxidizing conditions to coalesce the silica particles, the improvement wherein said refractory composition contains micronized particles of a compatible dopant that provides the fired preform with from about 0.01 to about 0.3 percent by weight of a nitride of silicon that decomposes and releases nitrogen for reaction with the silica, and wherein the fired preform is sintered at a temperature of at least 1700° C. to effect nitridation and to produce a quartz glass article containing a multitude of closely-spaced evenly-distributed nitrogen-containing gas bubbles of microscopic size.

29. A process according to claim 28 wherein the porous silica body is a slip-cast receptacle with a wall thickness of from 5 to 7 millimeters, the fired preform is mounted upside-down on a heated perforated mandrel of an electric induction furnace and then advanced with the mandrel into the furnace to start the sintering cycle, and the furnace is rapidly heated to increase the glass temperature from below 1400° C. to above 1600° C. and gradually to more than 1700° C. to cause the silica to coalesce and react with nitrogen released by said dopant, the total time for the sintering operation in the induction furnace being from 8 to 12 minutes, said nitride of silicon being formed by nitriding micronized particles of elemental silicon.

30. A process according to claim 28 wherein said porous silica body is formed by slip casting, the silica particles of said slurry have a purity of at least 99.95 percent and an average particle size of from 2 to 10 microns, the dopant comprises particles of silicon nitride or silicon oxynitride having an average particle size below 2 microns, and said article is a dense nitrided opaque quartz glass having a bubble population density of at least about 80 per square millimeter.

* * * * *